(12) United States Patent
Roy et al.

(10) Patent No.: US 7,064,796 B2
(45) Date of Patent: Jun. 20, 2006

(54) METHOD AND SYSTEM FOR RE-IDENTIFYING BROADCAST SEGMENTS USING STATISTICAL PROFILES

(75) Inventors: Yves Roy, Montreal (CA); Jean-François Pouliot, Montreal (CA); Jean-Charles Dupuis, Outremont (CA)

(73) Assignee: Eloda Inc., Montreal (CA)

( * ) Notice: Subject to any disclaimer, the term of this patent is extended or adjusted under 35 U.S.C. 154(b) by 435 days.

(21) Appl. No.: 10/310,190

(22) Filed: Dec. 5, 2002

(65) Prior Publication Data

US 2003/0121046 A1  Jun. 26, 2003

Related U.S. Application Data

(60) Provisional application No. 60/341,854, filed on Dec. 21, 2001.

(51) Int. Cl.
*H04N 5/14* (2006.01)
(52) U.S. Cl. .................. 348/700; 348/473; 348/462; 348/461; 725/22; 725/18; 725/20; 725/19
(58) Field of Classification Search ............... 348/700, 348/462, 461, 473; 725/22, 18, 19, 20
See application file for complete search history.

(56) References Cited

U.S. PATENT DOCUMENTS

| | | | |
|---|---|---|---|
| 3,919,479 A | 11/1975 | Moon et al. | 179/1 |
| 4,677,466 A * | 6/1987 | Lert et al. | 725/22 |
| 5,436,653 A | 7/1995 | Ellis et al. | 348/2 |
| 5,999,689 A | 12/1999 | Iggulden | 386/46 |
| 6,002,443 A | 12/1999 | Iggulden | 348/553 |
| 6,182,069 B1 | 1/2001 | Niblack et al. | 707/6 |
| 6,275,646 B1 | 8/2001 | Tada et al. | 386/46 |
| 6,295,092 B1 * | 9/2001 | Hullinger et al. | 348/468 |

OTHER PUBLICATIONS

Article "Automated Threshold Selection for the Detection of Dissolves in Mpeg Video" by G. Boccignone et al.
UPM-DISAM, Computer Vision Article: ADETECT: Automatic Detection and Recognition of TV Advertisements.
NOMAD (No More Advertising) website information sheets, Dec. 10, 2001.

* cited by examiner

*Primary Examiner*—Shawn S. An
(74) *Attorney, Agent, or Firm*—Matthew M. Roy; Ogilvy Renault, LLP

(57) ABSTRACT

A method and system for extracting segments from a broadcast television signal uses a mean display attribute value of pixels of each successive frame of a video component of the signal to identify segment transitions. Elapsed times between the identified segment transitions are compared with expected durations of segments, in order to detect intervals that are likely to constitute segments. Groups of the detected intervals are subjected to tests to see if they are temporally arranged in an expected distribution typical of segments in broadcast signals. The mean display attribute values concurrent with each detected segment are then used to form a statistical profile for the segment. These statistical profiles may be used to identify re-broadcast segments. Further a stream of mean audio amplitudes is preferably used to supply further segment transitions, to improve segment detection, and to provide more statistical values.

9 Claims, 15 Drawing Sheets

| Frame Timecode (s) | Average Luminance | Average Amplitude |
|---|---|---|
| 215.668 | 37 | 0.0473814 |
| 215.701 | 31 | 0.00875741 |
| 215.734 | 0 | 0 |
| 215.769 | 0 | 0.00314135 |
| 215.802 | 4 | 0.000940394 |
| 215.835 | 8 | 8.59E-05 |
| 215.87 | 14 | 0.0155843 |
| 215.904 | 21 | 0.115148 |
| 215.937 | 28 | 0.0387551 |
| 215.97 | 35 | 0.0206977 |
| 216.003 | 41 | 0.0257907 |
| 216.036 | 46 | 0.163235 |
| 216.071 | 51 | 0.0121121 |
| 216.104 | 52 | 0.0429868 |
| 216.137 | 52 | 0.0310194 |
| 216.17 | 52 | 0.0332483 |
| 216.203 | 53 | 0.110917 |
| 216.236 | 52 | 0.0812898 |
| 216.269 | 53 | 0.0209147 |
| 216.303 | 53 | 0.0284243 |
| 216.336 | 52 | 0.0259919 |
| 216.372 | 52 | 0.0823975 |
| 216.407 | 52 | 0.0866292 |
| 216.44 | 50 | 0.0180981 |
| 216.474 | 50 | 0.0648103 |
| 216.507 | 50 | 0.09021 |
| 216.54 | 51 | 0.0700277 |
| 216.574 | 51 | 0.0941253 |
| 216.606 | 50 | 0.0481545 |
| 216.639 | 50 | 0.0371433 |
| 216.672 | 51 | 0.0119267 |

FIG. 10  Col. 1  Col. 2  Col. 3

59.6451,6
65.658,30
95.714,30
125.689,30
155.718,30
185.753,15
200.874,15
215.928,30
245.868,6
251.614,29
802.12,10
811.755,30
841.939,60
901.818,30
932.194,30
961.865,60
1021.899,7
1028.843,10
1038.698,30
1068.671,9
1673.9,30
1704.27,5
1708.94,26
1734.92,29
1764.22,30

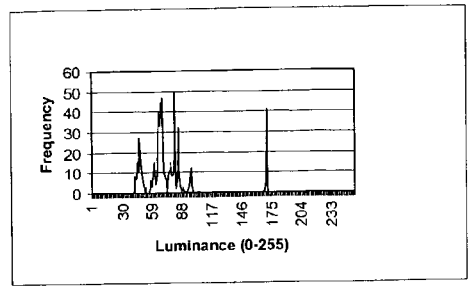
Level 0:1
Std deviation 8.066747247
Median 68
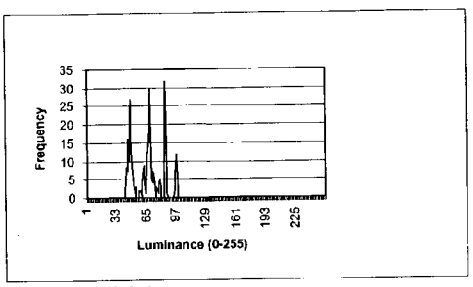
Level 1:1
Std deviation 4.489528598
Median 66
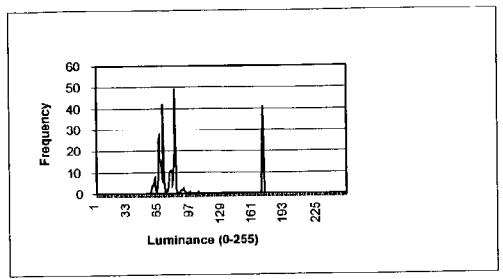
Level 1:2
Std deviation 5.734479266
Median 74
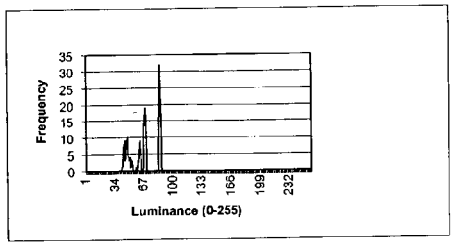
Level 2:1
Std deviation 2.950155259
Median 66
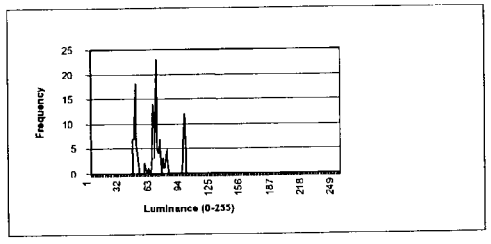
Level 2:2
Std deviation 2.599676521
Median 67
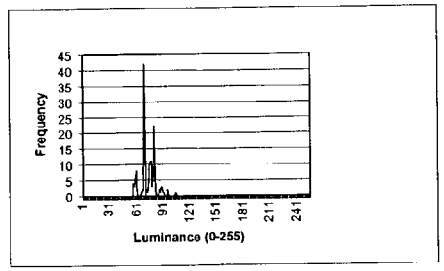
Level 2:3
Std deviation 3.346271612
Median 74
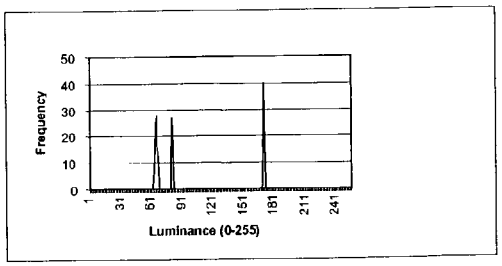
Level 2:4
Std deviation 4.069673154
Median 67
FIG. 19a-g

METHOD AND SYSTEM FOR RE-IDENTIFYING BROADCAST SEGMENTS USING STATISTICAL PROFILES

CROSS-REFERENCE TO RELATED APPLICATIONS

This application claims the benefit of priority under 35 U.S.C. 119(e) from U.S. Patent Application No. 60/341,854 filed 21 Dec. 2001.

MICROFICHE APPENDIX

Not Applicable.

TECHNICAL FIELD

The invention relates to the monitoring of broadcast segments in a broadcast signal, and, in particular, to a method and system for detecting, verifying, and generating statistical profiles of broadcast segments, for the purposes of identifying rebroadcast segments and enabling indexed retrieval of archived broadcast segments.

BACKGROUND OF THE INVENTION

Most television broadcasts are interrupted by publicity breaks that include commercial advertisements and other promotional segments. While these interruptions are received with irritation by many television viewers, in other situations many viewers want to view the advertisements. Viewers may want to view advertisements for entertainment, consumer information, or competitive intelligence purposes, for example. There are therefore at least two reasons to identify and extract segments from broadcast television signals: to eliminate publicity breaks from a broadcast program, or to store the advertisements for later viewing.

While automated procedures for identifying segments (including commercial advertisements) from broadcast signals for both of these purposes, are well known in the art, known procedures are generally inefficient, and relatively unreliable. One of the primary reasons for extracting the segments is to be able to identify rebroadcast segments. While it is well known in the art to provide signatures derived from an audio and/or a video portion of the broadcast signal, known methods of re-identifying broadcast segments need improvement.

Warren D. Moon teaches generating a signature for a broadcast signal in his U.S. Pat. No. 3,919,479, entitled BROADCAST SIGNAL IDENTIFICATION SYSTEM, which issued on Nov. 11, 1975. The signature is generated by sampling a low-frequency envelope of a predetermined size generated from a non-linear analog transform of the audio and video components of the broadcast signal, and digitizing the samples. Unfortunately the number of samples required to characterize the segment makes the signature cumbersome to match, and expensive to store.

Subsequently alternative procedures for generating smaller signatures have been developed that, unfortunately, poorly characterize segments. A number of patents have taught signatures generated from one or only a few frames of the segment. Given the imprecise methods available for defining when a frame begins, identification of a first frame in the segment is not reliable, consequently an obvious difficulty arises in identifying those particular frames in the broadcast signal so that the comparison is made correctly. For example, U.S. Pat. No. 6,002,443, entitled METHOD AND APPARATUS FOR AUTOMATICALLY IDENTIFYING AND SELECTIVELY ALTERING SEGMENTS OF A TELEVISION BROADCAST SIGNAL, which issued to Iggulden on Dec. 14, 1999, teaches the use of an average luminance value of select lines of a select frame of the segment. More specifically, 64 consecutive odd lines chosen after line 22 of an NTSC frame, of a $10^{th}$ frame after a segment transition event, are suggested for this purpose. The suggested signature is a small 64-bit value, one bit defined by each respective line, in relation to a threshold. While the signature is 64 bits long, it does not characterize more than the one frame of the segment.

Running Moon's system intermittently, upon detection of segment transitions, has been suggested, but, as is noted in U.S. Pat. No. 4,677,466, entitled BROADCAST PROGRAM IDENTIFICATION METHOD AND APPARATUS, which issued to Lert Jr. et al. on Jun. 30, 1987, stability of the broadcast signal needs to be assessed before the signature can be generated. Otherwise a risk of misidentifying the chosen frames of the segment may lead to errors. Stability testing is a computationally expensive procedure involving detection of segment transitions and scene changes by comparing average luminance values of successive frames. Apart from this complexity, which Lert's system bears, one or even a few frames are not adequate to characterize a segment. Some broadcast segments are minor variants of others, such as "donut ads", which are identical except for one or more frame sequences. Failure to differentiate these segments is not desirable in many cases. Particularly for competitive intelligence purposes, an advertiser's reuse of advertising content may be of interest.

Another method of generating a signature for a broadcast segment is taught in U.S. Pat. No. 5,436,653 entitled METHOD AND SYSTEM FOR RECOGNITION OF BROADCAST SEGMENTS, which issued to Ellis on Jul. 25, 1998. The signature generation method taught by Ellis involves calculating a difference vectors from average luminance values of pairs of predefined patches of pixels (both active and blanked) of the frame. There are 16 pairs of the patches, and consequently 16 difference values are calculated (by subtraction, for example) for each frame. Each of the 16 value difference vector is subjected to a plurality of vector transformations to yield the signature. While meritorious, the method requires complicated video edge detection, sophisticated vector transformation algorithms designed to improve the differentiation of the resulting signatures, and jitter compensation to adaptively modify a portion of the patches used to generate the averages. It is not clear how segments are delimited with enough precision to accurately identify the frames that are to be used for signature generation. While the invention does provide a relatively compact signature (assuming that relatively few frames are used for matching), the signature constructed is only representative of a few frames.

None of the prior art systems characterize a broadcast segment using features relating to its entire length while providing a reasonably-sized signature. Further, known systems fail to reliably distinguish two segments that have similar frame sequences, and misidentify common frame sequences in different segments. There therefore remains a need for a system that is largely immune to a broadcast signal's noise, jitter and instability, that efficiently and accurately characterizes substantially entire segments, and can be reliably used to identify common frame sequences in different broadcast segments.

SUMMARY OF THE INVENTION

Therefore an object of the invention is to provide an improved system for identifying broadcast segments.

Another object of the invention is to provide a method for characterizing broadcast segments using features associated with substantially all of the frames in the segment.

Yet, another object of the invention is to provide a method for characterizing broadcast segments that facilitates identification of segments that share a common frame sequence.

Accordingly a method for analyzing a broadcast signal is provided. The method involves generating a stream of mean display attribute values (and optionally also a stream of mean audio amplitude values) for successive frames of the broadcast signal. The mean display attribute value of a frame may be an average luminance value of all or selected pixels in the frame. In one embodiment of the invention, the mean display attribute value is calculated by taking a statistically representative sample of the pixels, and calculating an average of corresponding luminance values. For example, 80 percent of pixels on 10 diagonals of the frame can be used to provide the sample. In one embodiment, the mean audio amplitude stream is generated by averaging an absolute value of a normalized audio amplitude of samples of the audio signal concurrent with a frame, in a manner known in the art.

After the mean display attribute stream has been generated, candidate segment transitions are detected. The candidate segment transitions are detected in a way that minimizes the effects of noise and other transmission/reception artifacts, using a transition transient suppression technique. In one embodiment, a set of selection rules are applied to identify candidate segment transitions using a video threshold (or optionally an audio threshold), to include or exclude neighboring frames.

After the frames corresponding to candidate segment transitions have been detected, corresponding transition points of corresponding candidate segment transitions are derived, and time code intervals are detected by computing elapsed times between the transition points, and comparing the elapsed times with expected durations of broadcast segments. If the elapsed time between two transition points is, within a predefined tolerance, an expected duration of a segment, a corresponding time code interval is detected.

Time code intervals that are deemed most likely to constitute segment transitions, according to a set of rules, are then identified. Preferably the time code intervals are evaluated in accordance with a confidence measure associated with the time code intervals. The confidence measure of a time code interval is preferably defined in relation to a weight of a transition point that delimits the time code interval, an initially assigned confidence measure associated with the time code interval, and a measure of how similarly a group of time code intervals resembles a publicity break. The weight of a transition point indicates a measure of agreement between the frames of a candidate segment transition from which the transition point was derived, and typical segment transitions. If both the mean display attribute and mean audio amplitude streams are used, coincidence between candidate segment transitions detected in the two mean value streams is a strong indicator of agreement, as is reflected by the weights, in preferred embodiments. The initially assigned confidence measure is determined by how closely the computed elapsed time between the delimiting transition points matches an expected duration, the relative frequency of occurrence or importance of detection of the expected duration, and may further depend on the weights of the delimiting transition points. Resemblance with a publicity break may be determined by comparison with publicity break reference patterns, or a set of rules pertaining to the expected arrangement of segments in publicity breaks.

Finally, parts of the mean display attribute stream (and optionally the mean audio amplitude streams also) concurrent with identified time code intervals are used to generate statistical profiles. The statistical profiles characterize respective probable segments that coincide with the respective time code intervals.

Preferably the statistical profiles comprise a plurality of values of statistical properties that are generated with at least one distribution derived from a set of consecutive frames within the time code interval. While there are uncountably many statistical properties, preference is given to those that vary with the whole distribution, those that are largely immune to noise, and those that characterize independent aspects of the distribution. There remain many ways of characterizing the probable segment. A preferred embodiment involves multiply parsing the set of frames into subsets. Preferably each parse of the set of frames is associated uniquely with a level $(0, 1, 2, \ldots)$, and each level n evenly subdivides (parses) the set of frames into twice as many subsets as a level n-1, so that, as the level 0 parsing produces one subset equal to the set (preferably less an initial and final buffer), the equation $2^{level}$ determines the number of subsets defined at the level.

A system of the present invention requires at least a signal analyzer, adapted to receive a broadcast signal, and generate at least the mean display attribute stream and (preferably also the mean audio amplitude streams). Generically the mean audio amplitude and mean display attribute streams are herein referred to as mean value streams. The signal analyzer publishes a copy of the mean value stream(s), and analyzes a copy of the mean value stream(s) to generate the segment demarcation list. Accordingly the signal analyzer may be divided into the following functional blocks: at least one mean value calculator, a transition point and interval detector, and a time code interval evaluator. The mean value calculator(s) generate(s) (respective) mean value stream(s) by calculating or approximating corresponding mean values of each frame in sequence. The transition point and interval detector generates the segment demarcation list, from the mean value stream(s). The time code interval evaluator receives the segment demarcation list, and revises the initially assigned confidence measures in response to an evaluation of how well groups of the time code intervals resemble publicity breaks. Once the confidence measures have been reviewed, a segment demarcation list generator selects those time code intervals that are most likely to constitute segments. A time delay storage receives the segment demarcation list and forwards it to a statistical profile generator along with parts of the mean value stream(s) that coincide with the time code intervals. The statistical profile generator creates at least one distribution from respective parts of the mean value stream(s), and applies known statistical analysis techniques to derive a plurality of values of statistical properties of the respective parts. These statistical properties are used to characterize corresponding probable segments, and so are preferably substantially independent values that characterize the entire respective part, and are substantially immune to noise and other signal transmission/reception artifacts.

The transition point and interval detector is adapted to scan the mean value stream(s) to identify candidate segment transitions. Transition points are derived by a transition point (collator and) evaluator using the candidate segment transitions by selecting a representative (minimum) time code for the candidate segment transition, and computing a weight that corresponds to a measure of likelihood that the candidate segment transition is a segment transition. If two or more mean value streams are used, coincidence between the representative time codes (minima) detected in the two streams is a criterion used for assessing the likelihood. The transition point and interval detector further comprises an interval detector for calculating elapsed times between the transition points, and comparing these elapsed times with expected durations of broadcast segments. An initial confidence measure calculator uses respective weights of, and elapsed times between transition points to assign an initial confidence measure to each respective detected time code interval.

BRIEF DESCRIPTION OF THE DRAWINGS

Further features and advantages of the present invention will become apparent from the following detailed description, taken in combination with the appended drawings, in which:

FIG. 10 is a table illustrating mean display attribute and mean audio amplitude streams generated from one second of a broadcast television signal;

FIGS. 19a–g are example plots of a hierarchy of distributions in accordance with the invention, from which a plurality of statistical values are calculated.

It should be noted that throughout the appended drawings, like features are identified by like reference numerals.

DETAILED DESCRIPTION OF THE PREFERRED EMBODIMENT

The present invention provides an efficient method for characterizing segments extracted from broadcast signals. As is well understood in the art a segment of a broadcast signal is a part of a program, an advertisement, or other sequence of frames associated with a program delimited by other segments. A statistical profile is generated by binning mean values of a display attribute of frames in a segment (optionally also binning mean values of mean audio amplitude values). Preferably, the mean values are multiply binned to create a plurality of statistical distributions, from which values of a plurality of statistical properties are computed. The mean values represent corresponding frames of the broadcast signal. Efficiently, the same mean values are used in an improved method for detecting probable segments. The improved method involves applying detection criteria to streams of the mean values to extract candidate segment transitions, having respective transition points. Elapsed times between the transition points are then calculated, and compared with expected durations of segments to detect intervals. Finally the method involves using expected arrangements of segments in broadcast signals to aid in the selection of intervals that are most likely to constitute segments. The mean values concurrent with the selected intervals are binned to create a plurality of distributions. The distributions are analyzed using standard statistical techniques, to obtain values of at least one statistical property. The values are used to form the statistical profile. The statistical profile may then be used to determine if a received broadcast interval matches a previously broadcast segment.

Method Overview

Figure 1:
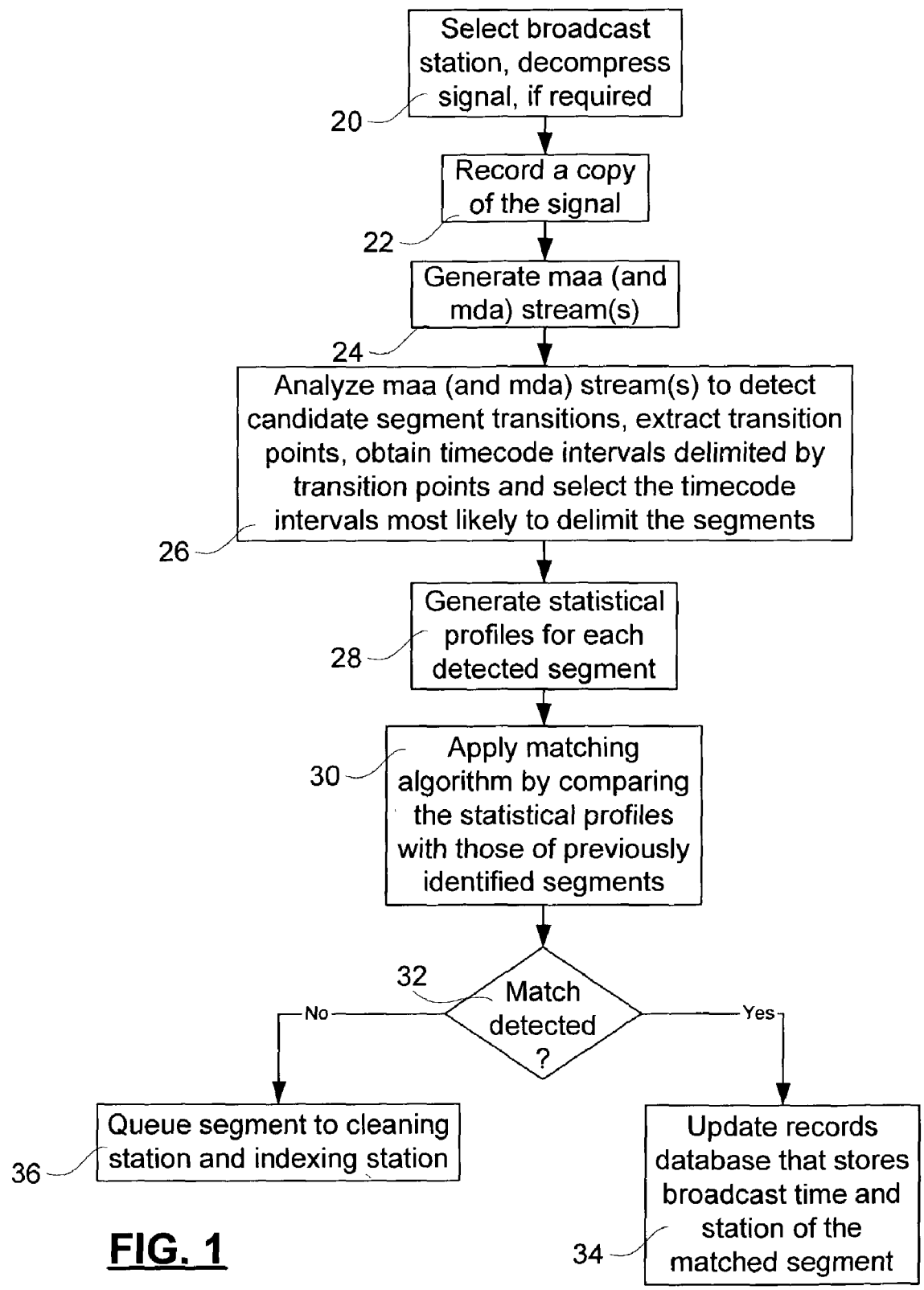
FIG. 1 is a flow chart illustrating principal steps involved in extracting a segment, in accordance with the invention.

FIG. 1 is an overview of a method of extracting a segment in accordance with the invention. In step 20, a broadcasting station is selected (assuming multiple stations are received at a broadcast signal receiver). If a selected broadcast signal is received in a compressed format, it is decompressed. A copy of the broadcast signal is stored by a recorder (step 22) and, in step 24, a mean display attribute stream (mda) (and optionally also a mean audio amplitude stream (maa)) is generated from the broadcast signal. Generation of the mean display attribute (and optional mean audio amplitude) stream(s) is further discussed below, particularly with reference to FIGS. 2, 7, 8&9. The mean display attribute stream (and optional mean audio amplitude stream) is analyzed in multiple passes (step 26). In a first pass, candidate segment transitions are detected from the mean display attribute stream (and optionally from the mean audio amplitude stream). The candidate segment transitions are analyzed to extract a transition point (a time code and a corresponding weight). Then elapsed times between the transition points are computed and used to identify time code intervals. Finally, the time code intervals are evaluated to select those most likely to constitute segments, in accordance with a predefined set of rules. The step of analyzing the (optional mean audio amplitude and) mean display attribute streams is further discussed below, particularly with reference to FIGS. 3, 13 & 14.

In step 28, the selected intervals, received in a segment demarcation list (which is a list of the time code intervals that are deemed likely to constitute segments), are used to retrieve corresponding parts of the mean display attribute stream (and optionally the mean audio amplitude stream), which is used to generate at least one distribution for each of the selected intervals. Each of the distributions is analyzed to obtain a set of values of statistical properties, also in step 28. A method for generating a statistical profile is further described below with reference to FIGS. 4, 17, 18&19*a*–*g*. In step 30, each statistical profile of a selected interval is compared with those of archived segments. If a match is detected (in step 32), a record of broadcast time and station is created. If no match is detected (in step 32), either the interval has not yet been identified, or it is not a broadcast segment. A segment in a television broadcast signal may be a news flash, a "bumper", a commercial advertisement, a promotional spot, or other such block of programming that interrupts content of a program, and is separated from programming content and/or another segment by a segment transition.

In step 36 the interval is queued for viewing at cleaning and indexing stations. The cleaning station is used by an operator to review the segment demarcation and matching, and the indexing station is used to create a name and list of attributes of segments that are advertisements, so that the advertisement is indexed for content-based retrieval.

Audio and Video Fade Detection

Figure 2:
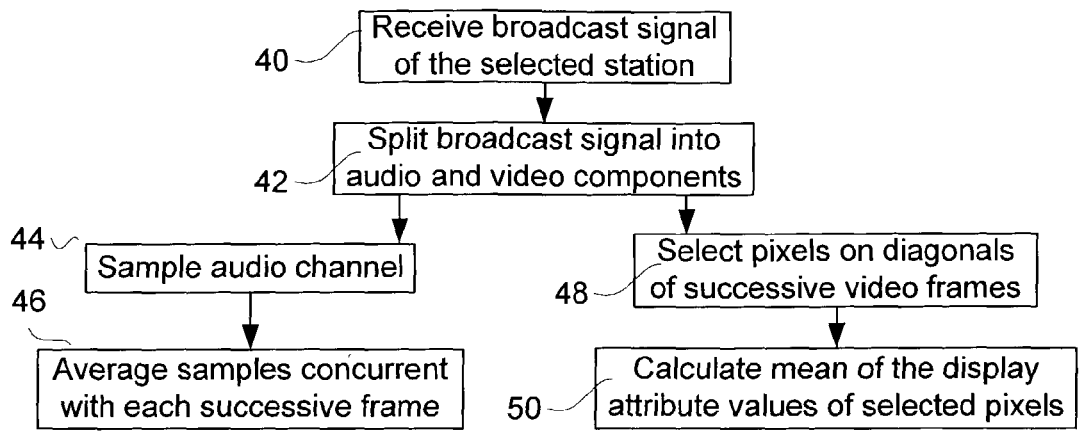
FIG. 2 is a flow chart illustrating principal steps involved in computing mean value streams, in accordance with the invention.

FIG. 2 illustrates principal steps involved in detecting segment transitions (in North America, usually audio and video fades) in a broadcast signal, to generate a mean audio amplitude stream and a mean display attribute stream. In step 40, the broadcast signal (or a copy thereof) is received. The broadcast signal is split into a audio component and a video component (step 42), each of which is supplied to respective audio and video processor modules. The audio processor module receives the audio component and samples the audio component (step 44) in a manner known in the art. Preferably, prior to sampling, the audio component is processed to generate an absolute normalized audio amplitude signal.

In step 46, the samples concurrent with each frame are respectively averaged, generating the mean audio amplitude values of respective frames. The mean audio amplitude values of successive frames, indexed by a time code, form the mean audio amplitude stream.

In step 48, the video processor module receives the video component. A mean display attribute (such as mean luminance) is calculated for each frame. There are many ways of calculating a mean value of a display attribute. Most precisely, the display attribute value may be read for each pixel of the frame and averaged, however, this most precise method is computationally expensive and unnecessary. A statistically representative sampling of the 307,200 active pixels in a national television system committee (NTSC) standard frame (for example) is reliable enough for current use. In accordance with the illustrated embodiment, a set of pixels is chosen for the statistical sample using a predefined rule (also in step 48). More specifically, 80 percent of pixels lying on 10 predefined diagonals have been found to be sufficient. In step 50, the average of the display attribute value is calculated. The average may be a number, for instance, or it may be an ordered set of values that represents a mean of the sampled values. For instance, an ordered set of average values could be used, where each of the average values is an average of a component of the video signal.

Segment Demarcation List Generation

Figure 3:
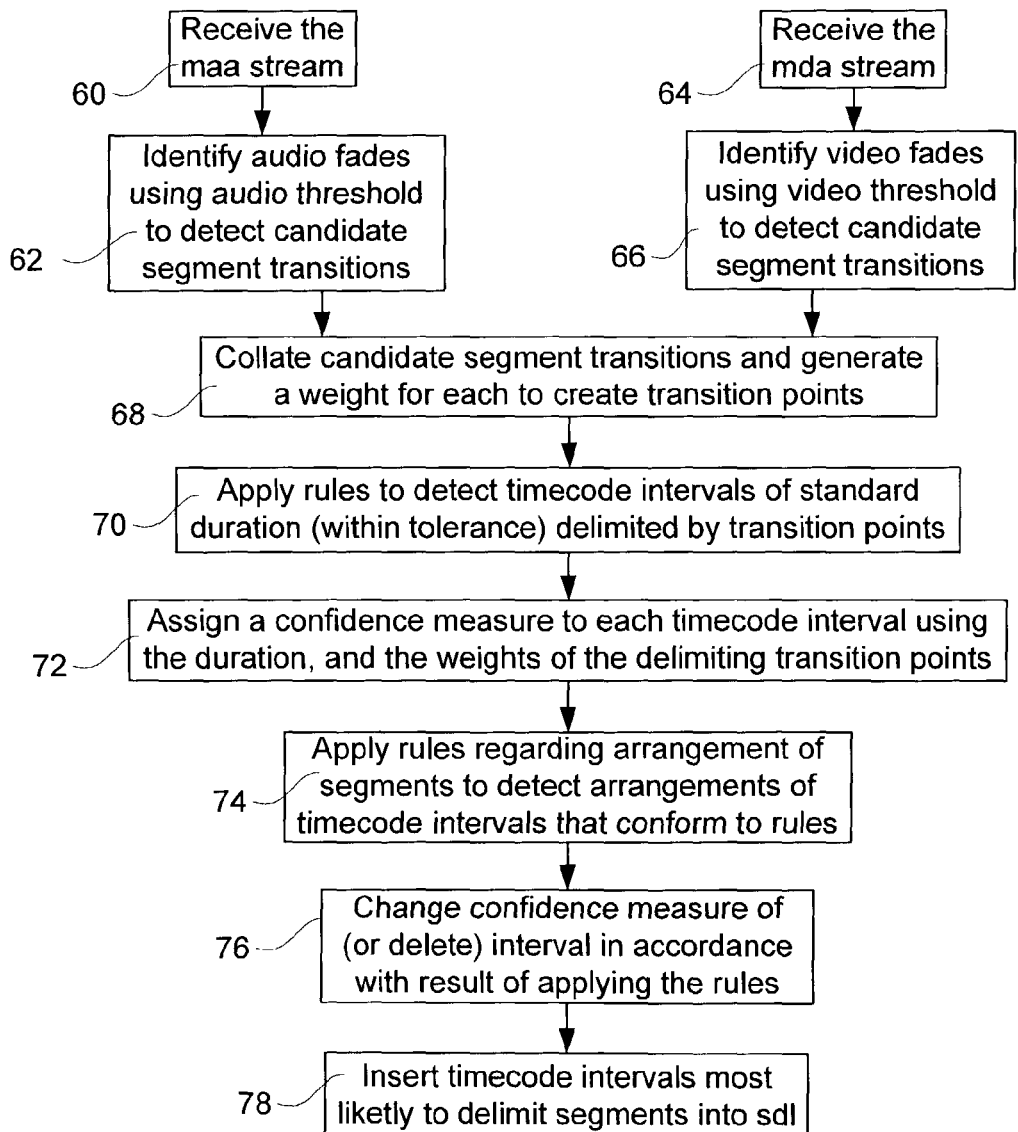
FIG. 3 is a flow chart illustrating principal steps involved in analyzing mean value streams to select time code intervals most likely to constitute segments, in accordance with the invention.

FIG. 3 illustrates principal steps involved in analyzing the mean value streams to identify and select time code intervals most likely to constitute segments, according to a predefined set of rules. The time code intervals are delimited by transition points derived from respective candidate segment transitions detected in the mean value streams. The mean audio amplitude stream is received (step 60), and audio fades therein are identified (step 62). Independently, the mean display attribute stream is received (step 64), and video fades therein are identified (step 66). The audio and video fade identifications may be done by comparing the mean audio amplitude/mean display attribute values (mean values) of each frame with audio/video thresholds, respectively. These comparisons provide a measure of similarity between a mean value of a received frame and a mean value of a frame in a segment transition. In accordance with North American television broadcasting standards, segment transitions consist of a video fade-to-black and an audio-silent frame. Consequently detecting segment transitions in North American broadcast signals uses thresholds approaching zero. The audio and video thresholds may be tuned by upstream processes to modify sensitivity in dependence on a number of audio and video fade identifications.

Preferably the audio and video fade identifications apply transition transient suppression techniques. As most segment transitions are defined by audio and/or video fades that comprise a plurality of consecutive frames, and because noise is known to perturb the low audio and video mean values, it has been found that often a segment transition is interrupted by a value that exceeds the threshold. It is therefore preferable to inhibit exclusion of frames from substantially sequential groups of audio/video fades, when forming candidate segment transitions. While this may be accomplished using any number of methods, including by the application of smoothing functions to the mean audio amplitude prior to audio and video fade identifications, etc., favorable results have been obtained using selection criteria designed to explicitly preclude the inclusion or exclusion of particular frames in dependence upon the inclusion or exclusion of neighboring frames. A neighborhood of about 25 frames has been found to be useful when grouping the frames into candidate segment transitions. In particular, it has been found that forming candidate segment transitions representing consecutive audio/video fades (and interrupting frames: i.e. those above the threshold between consecutive audio/video fades) is efficient, as it cuts down on the number of candidate segment transitions detected, which, in turn, facilitates analysis.

In accordance with an embodiment of the invention, a candidate segment transition is defined to be a set of frames between a beginning and an ending frame, both of which having mean values below a respective audio/video threshold, and containing fewer than 25 consecutive interrupting frames (frames above the threshold). In other embodiments, a maximum duration threshold, a maximum number of, or numbers of groups of, interrupting frames, etc. may be used to limit a number of frames in a candidate segment transition.

This may be particularly useful during a period of erratic mean values. A pair of values are used to characterize a candidate segment transition, namely; a minimum and a duration of a candidate segment transition. The minimum is a time code of a lowest mean value in the candidate segment transition, and the duration is the elapsed time between the start and end of the candidate segment transition. In the event that multiple frames in the duration share a lowest mean value, any one of the first, last or middle-most frame (with the lowest mean value) is used in accordance with the present embodiment. Alternatively, a maximum number of consecutive frames having the lowest mean value may be determined and may be used to select a minimum for the candidate segment transition. The positions of interrupting frames in relation to the lowest mean values, and/or a highest mean value of the mean audio amplitude or mean display attribute stream between the plurality of frames, may also be used in the selection of the minimum of the candidate segment transition In step 68, the candidate segment transitions received from the mean value streams are collated and evaluated to form a transition point list (pl). The collation involves comparing the minima detected from the mean audio amplitude stream with those detected from the mean display attribute stream. If the minimum of a candidate segment transition detected in the mean display attribute stream "coincides" with a minimum of a candidate segment transition detected in the mean audio amplitude stream, then a transition point will be derived from only one of the two candidate segment transitions and inserted into the transition point list. Different embodiments of collators may use different criteria for determining coincidence of two minima. Two minima may be said to coincide if, for example:

1) a frame exists in the candidate segment transitions of both the transition points;
2) half the sum of the two durations is greater than the difference in time between the two minima; or
3) the equation $|m_a - m_v| - (d_a^2 + d_v^2)^{1/2} < T$ is satisfied, where $m_a$ and $d_a$ are the minimum and duration of a candidate segment transition detected in the mean audio amplitude stream, respectively, and $m_v$ and $d_v$ are the minimum and duration of a candidate segment transition detected in the mean display attribute stream, and T is a predetermined threshold value.

Each transition point in the transition point list is defined to include at least a time code of the minimum (a time code/time of a transition point refers to the time code of the minimum of a candidate segment transition from which the transition point is generated), and an associated weight. The weight of a transition point, according to the present embodiment, is calculated in dependence on the streams from which the corresponding candidate segment transition was detected, and coincidence. In accordance with alternative embodiments however, the weight may also vary with any of the following: a duration of, a number of interrupting frames in, or a duration of a minimum mean value of, the candidate segment transition from which the transition point was derived, a number of transition points detected in the last 30 seconds (or other suitable time interval) of mean value streams, etc. In yet other embodiments, both mean values of the minimum, derivatives of the streams at the minimum, and/or measures of similarity between one or more typical segment transitions, are used to create the weight. According to the present embodiment, the greater a weight of the transition point, the more closely it resembles a frame in a typical segment transition. It is a straightforward extension of the transition point detector to additionally detect a break in closed captioning, or to use vertical interval time code (VITC) cues in line 20 of the composite frame of an NTSC compliant broadcast signal, to improve detection of the segment transitions, and to improve the values of the weights accordingly.

In step 70, the transition point list is examined to detect intervals of time between transition points in the transition point list that are of an expected duration. As is known to those skilled in the art, in North America, advertising and promotional materials are generally grouped together in publicity breaks of a minimum duration of 1 minute 30 seconds, to a maximum duration of 5 minutes. National regulation agencies currently restrict broadcasters from including more than 6 minutes of commercial advertisement material per hour. The publicity breaks generally include a mixture of advertisements, promotions, and bumpers of predetermined length: generally, ads are 10, 15, 30, or 60 seconds long; promotions are of integer duration varying from 5 to 15 seconds; and bumpers can be 3, 4, 5 or 6 seconds long. Consequently, the expected durations are integer lengths between 3 and 15 seconds, or one of 15, 30 and 60 seconds.

There are many algorithms known in the art that could be used to sift through a stream of time codes (the minima of the transition points in the transition point list) to identify intervals of predefined durations. A search algorithm may look first for preferred or most expected durations, or search for a next (or previous) transition point and calculate an elapsed time between the two. Search algorithms may seek one, a preset number of, or an undefined number of intervals that begin/end with a given transition point, may be sought. In accordance with the present embodiment, for a given transition point, a shortest interval of an expected duration (within tolerance) is selected by computing an elapsed time between the given transition point and a next transition point in the transition point list. If the elapsed time is an expected duration (to within a first tolerance), the interval of the given transition point is identified. Otherwise an elapsed time between the given transition point and a transition point subsequent in the transition point list to the next transition point, is computed. This computation is repeated for successive transition points until a computed elapsed time exceeds a longest expected duration, or is an expected duration (within the first tolerance). In the former case, the method may recommence with a second, more generous, tolerance.

An interval detected in this manner (herein a time code interval) is bounded by two transition points, and so contains a start time (the time code of a first of the two transition points called the initial transition point) and an (approximate) end time. In accordance with the present embodiment of the invention, the time code interval is defined by the initial transition point, and the expected duration. In step 72, an initial confidence measure is assigned to each of the time code intervals in dependence on a result of the interval detection algorithm, a measure of the deviation from the expected duration and the weights of transition points that delimit the detected intervals. The initial confidence measure indicates a likelihood that the time code interval constitutes a segment, given a characterization of typical segments. For example a frequency of occurrence of the expected durations may be used with the weights of the delimiting transition points, and a difference between the expected duration and the calculated elapsed time, to calculate the initial confidence measure.

In step 78 confidence measures of respective time code intervals are changed, and/or time code intervals are deleted as a result of applying predefined rules (step 76) relating to the arrangement of the segments in publicity breaks. As noted above, advertising and promotional materials are generally grouped together in publicity breaks of 1⅓ to 5 minutes in length. Publicity breaks include advertisements, promotions, and bumpers in a denumerable set of arrangements. While the set of arrangements is relatively stable, it is preferable that a system used to support the invention be designed with the flexibility required to readily adapt to new publicity break patterns. A number of rules can be derived for evaluating a probability that a time code interval identifies a segment. The rules are used to review respective confidence measures assigned to respective intervals (step 76). A first rule is to identify time code intervals that are not closely adjacent to any other time code interval. Each time code interval thus identified has its confidence measure reduced. Application of a second rule increases the confidence measures of pairs of time code intervals that begin and end at substantially the same time code. A third rule may be used to decrease a confidence measure of at least one of two time code intervals that overlap. Other rules can be used to identify which of the two time code intervals is to have their confidence measure decreased, in dependence upon, for example, the initial confidence measures assigned to the two, or a number of sequential intervals in which either of the two is a part, etc. Other rules may relate to a minimum, maximum or expected number of consecutive bumpers or promotions, etc. in a publicity break, or to a minimum, maximum, or expected total number of 3–14 second-long segments in a publicity break. Further a maximum length of a publicity break and a minimum length of a publicity break may be used to increase or decrease confidence measures of respective time code intervals accordingly. Further still, a minimum, maximum, or expected program duration between publicity breaks may be used to increase or decrease confidence measures. Another rule involves comparing sequential groups of the time code intervals with publicity break reference patterns, in order to increase/decrease the confidence measures of the time code intervals in the sequential groups, in accordance with a probability of the publicity break reference pattern, and how well the time code intervals fit the respective publicity break reference pattern. As a result of the reviewing of the confidence measures, in step 78, intervals having a high enough confidence measure are written to a segment demarcation list. The segment demarcation list is used to extract time code intervals that probably delimit broadcast segments.

Statistical Profile Generation

Figure 4:
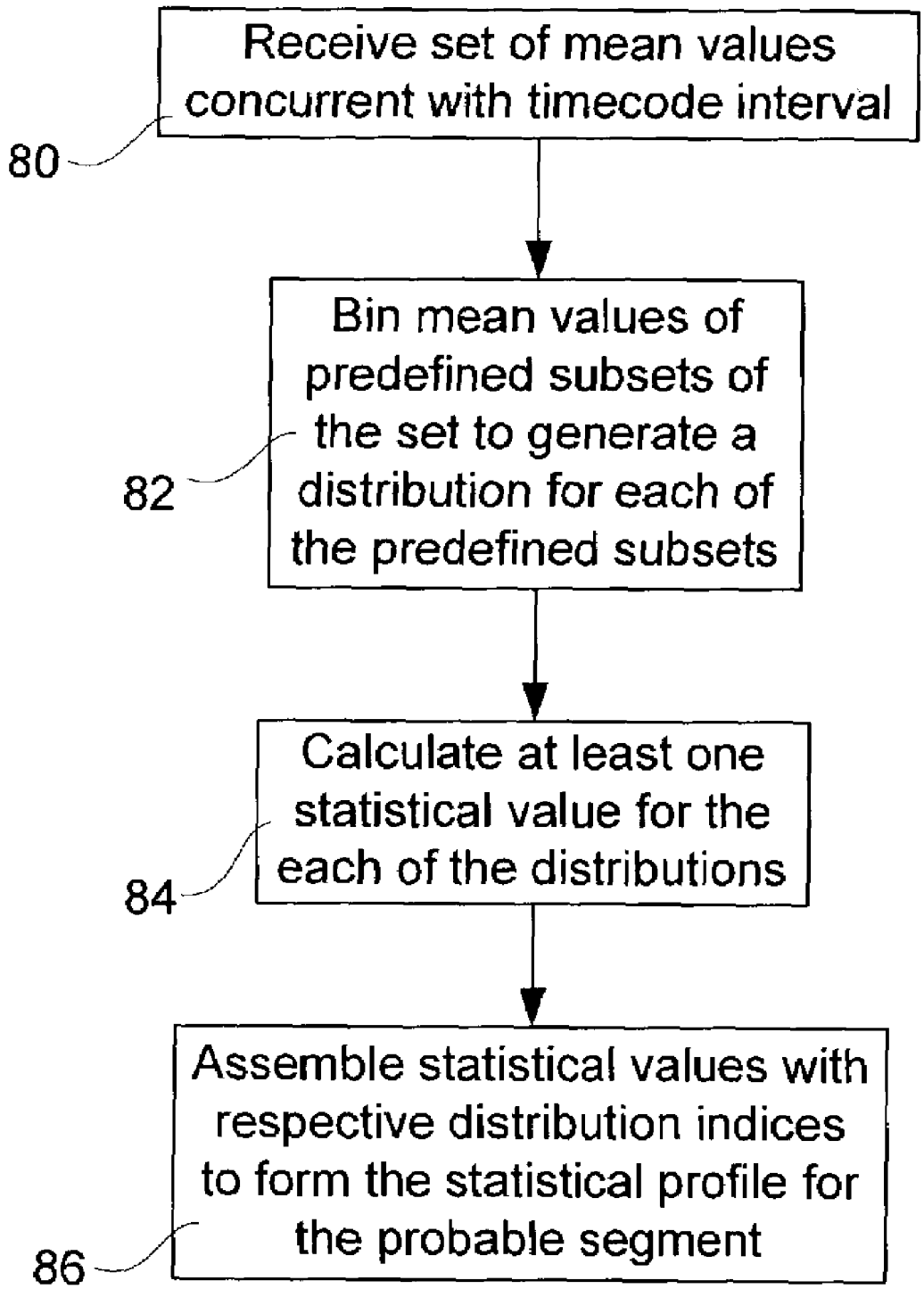
FIG. 4 is a flow chart illustrating principal steps involved in creating a statistical profile for a selected time code interval, in accordance with the invention.

FIG. 4 illustrates principal steps involved in creating a statistical profile for an extracted time code interval. In step 80, a mean value stream concurrent with a time code interval in the segment demarcation list, is retrieved. Preferably the first and last 10 percent of a set of the frames of the mean value stream are discarded as they are in a "buffer zone". The buffer zones minimize the effect of imprecise start and end frame identification by eliminating initial and final frames that may contain some extraneous frames from a previous/subsequent segment, or program, as the inclusion of these extraneous frames may have an adverse impact on the reliability of the system. Preferably the stream is used to generate a number of distributions. A convenient manner of forming the distributions is chosen, which involves defining a hierarchy of levels by multiply parsing the set of frames into subsets. At level 0, mean values of the time code interval, (less the 10 percent buffers zones) are used to create the distribution. At level 1 there are two distributions; a first half (level 1:1) and a second half (level 1:2) of the time code interval. Levels 2:1–2:4 correspond with the first, second, third and fourth quarters of the time code interval, respectively. The number of distributions generated in this manner is limited only by computation time and the number of frames in the interval, as there must be a statistical number of frames in each distribution in order to ensure reliability. Preferably there are several audio and video distributions defined for each time code interval.

In step 82, each of the mean values of frames in each of a predefined family of the subset is binned to create a respective distribution. Binning is a technique known in the art for tabulating a relative number of occurrences of respective outcomes or values. As the mean display attribute values are discrete (a one byte luminance value), a natural choice for the bins of these distributions will be the 256 possible values. The mean audio amplitude values are digitally measured. However, as is known to those skilled in the art, the increments may yield sparsely populated distributions that are susceptible to noise. Consequently, selection of audio amplitude increments that yield bins of reasonable size may be, required. This can be accomplished in a manner known in the art.

In step 84 the distributions are analyzed, and a value of at least one statistical property of each of the distributions is calculated. There are, of course, an unlimited number of reasonably stable statistical properties that can be measured for any distribution. Standard statistical programs exist for calculating many different statistical values for distributions. It is advantageous to obtain as much of a characterization of the distribution as possible while limiting the complexity and number of statistical measures. Furthermore, in order to minimize errors caused by a few incorrect values in the distribution, properties of substantially the entire distribution are preferred. Consequently, substantially independently varying statistical properties are preferred. So, for example, a mean value and a measure of mean deviation from a mean value, may be used to characterize the distribution. While many other statistical properties could be chosen, a median value and a standard deviation have been chosen for embodiments of the invention. Examples of other statistical properties include: nth moments, for arbitrary natural number n; a mean value; a multiplicative mean value; and a smallest block of mean values containing 50 percent of the mean values, and it's center, to name a few.

In step 86, the values of the statistical properties for each distribution of a time code interval are assembled. Preferably each of the statistical values is uniquely indexed, so that a distribution from which it was generated, and the statistical property it is a value of, can be readily retrieved.

Archiving

Figure 5:
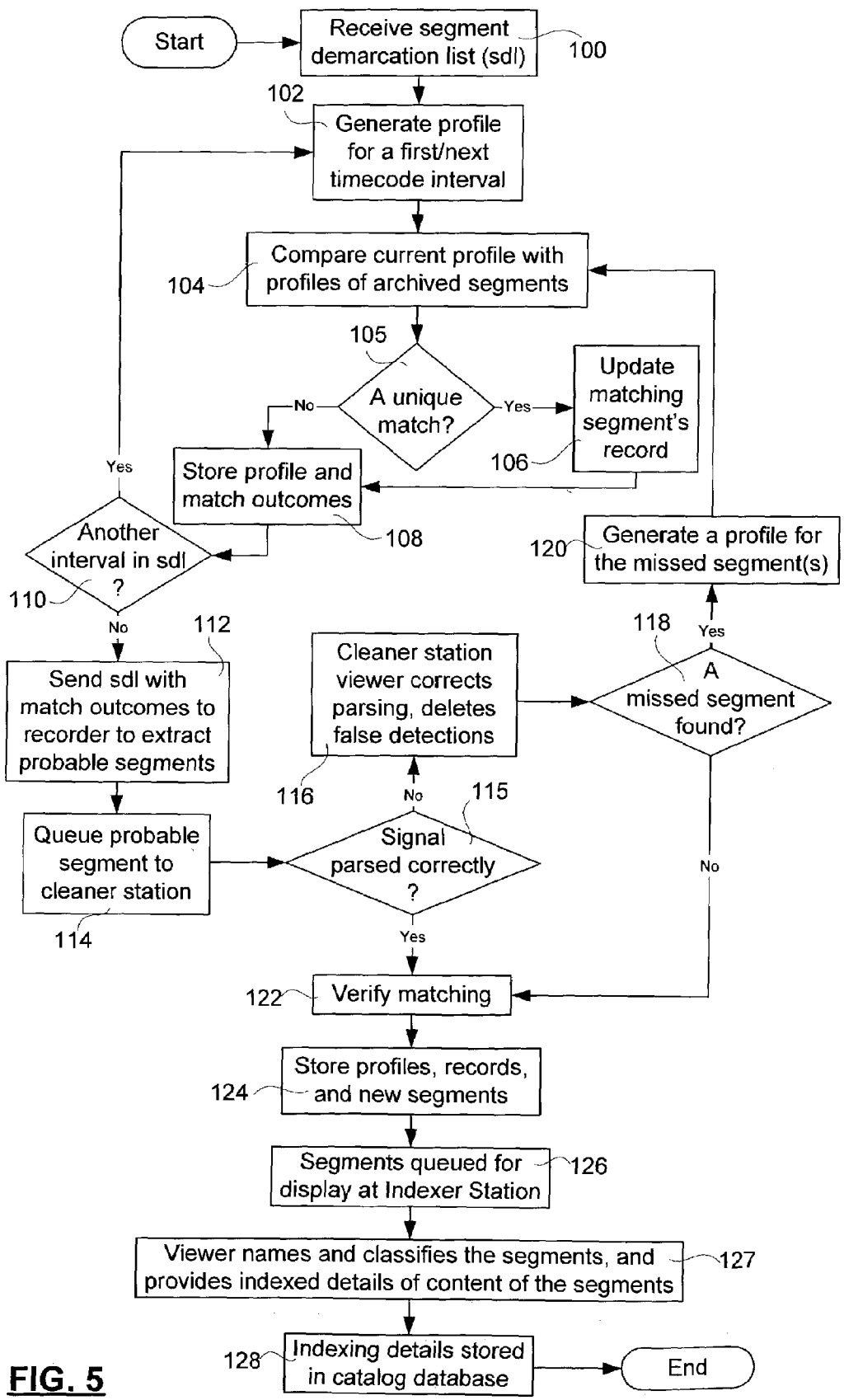
FIG. 5 is a flow chart illustrating principal steps involved in verifying and archiving segments detected in accordance with the invention.

FIG. 5 illustrates principal steps involved in archiving a segment detected in accordance with the present invention. In step 100, a segment demarcation list including all time code intervals detected within a fixed length of the broadcast signal, is received, and, as described above with reference to FIG. 4, a profile is generated for a first time code interval in the segment demarcation list (step 102). The generated statistical profile is compared with statistical profiles of known segments archived in a profiles database (step 104). The profiles archived in the profiles database are derived using the same procedure, so that a match with an archived segment profile nearly always indicates that the time code interval corresponds to a rebroadcast of the segment. If, in step 105, it is determined that a profile of one and only one archived segment matches the profile of the time code interval, a message is sent to a segment records database (step 106), that is responsible for storing a time and a station at which a segment is aired. Content of the message is used to update the matched segment record in the database with information regarding the broadcast event. In accordance with other embodiments of the invention, the step of updating may be performed only after it has been verified that the time code interval matches the archived segment, as will be further explained below.

After the message is sent (or, if in step 105 it is determined that either no archived segment matches (negative), or that multiple segments matched (ambiguous)), an outcome of the comparison with archived segments (positive, negative or ambiguous), along with the generated profile, is stored (step 108). In step 110, it is determined whether or not another time code interval remains to be matched in the segment demarcation list. If another time code interval remains, a profile is generated for a next time code interval in the segment demarcation list (return to step 102). Once all of the time code intervals' profiles have been sent for matching, the segment demarcation list and outcomes of matching for respective time code intervals are forwarded to a recorder (step 112). The recorder extracts a recorded copy of the fixed length of broadcast signal, and forms a timeline containing probable segments defined by respective time code intervals of the segment demarcation list, and flags each of the intervals for viewing at a cleaner station (step 114). A user application interface provides the cleaner station with the timeline representing the fixed length of broadcast segment. The timeline includes blocks of time codes that represent the probable segments that have been matched (positive), probable segments that have not been matched (negative), and those that have matched with more than one segment (ambiguous). The cleaner station operator is responsible for reviewing the segmentation of the timeline, by determining (in step 115) if the timeline correctly parses the broadcast signal. If the cleaner station viewer finds an error in the timeline, in step 116, the timeline is first corrected by deleting any probable segments that are not broadcast segments, along with the associated profiles and match outcomes. If the cleaner station viewer finds (in step 118), a segment that has not been included in the timeline, the start and end time codes of the segment are used to generate a profile for the missed segment (step 120), and the procedure returns to step 104. If no missed segment is found, or if the timeline is found to correctly parse the broadcast segment (in step 115), the cleaner station viewer verifies the matching (step 122). Verifying the matching involves disambiguating matching results. If, for example, the outcome of the matching is ambiguous, two or more archived segments have "matched" (i.e. their respective profiles have matched profiles of) a time code interval. The cleaner station viewer identifies which of the archived segment matches (assuming one does), and deletes the references to the other archived segments. Preferably, the user application interface is further adapted to automatically perform step 118, as required, to update the matching segment record. Further it is preferable that if the cleaner station viewer identifies that two or more archived segments match, the merging of the records for the two files can be performed. In accordance with alternative embodiments, the cleaner station viewer, or an indexer (further described below) verifies that matching segments are correctly identified, or that unmatched segments are novel.

Once matching has been verified, those segments that remain unmatched are deemed to be new segments. In step 124, records in a segment record database, and the profiles database are created for new segments. In step 126, the new segments are queued for viewing at an indexer station. An indexer at the indexer station views the new segments (step 127), names the segment, and provides a list of attributes of the content of the segment. These attributes are used to enable content-driven retrieval of the segments. In step 128 the attributes, name, and an identifier of the corresponding segment stored in the segment database, are stored in a segment catalog database.

System Overview

Figure 6:
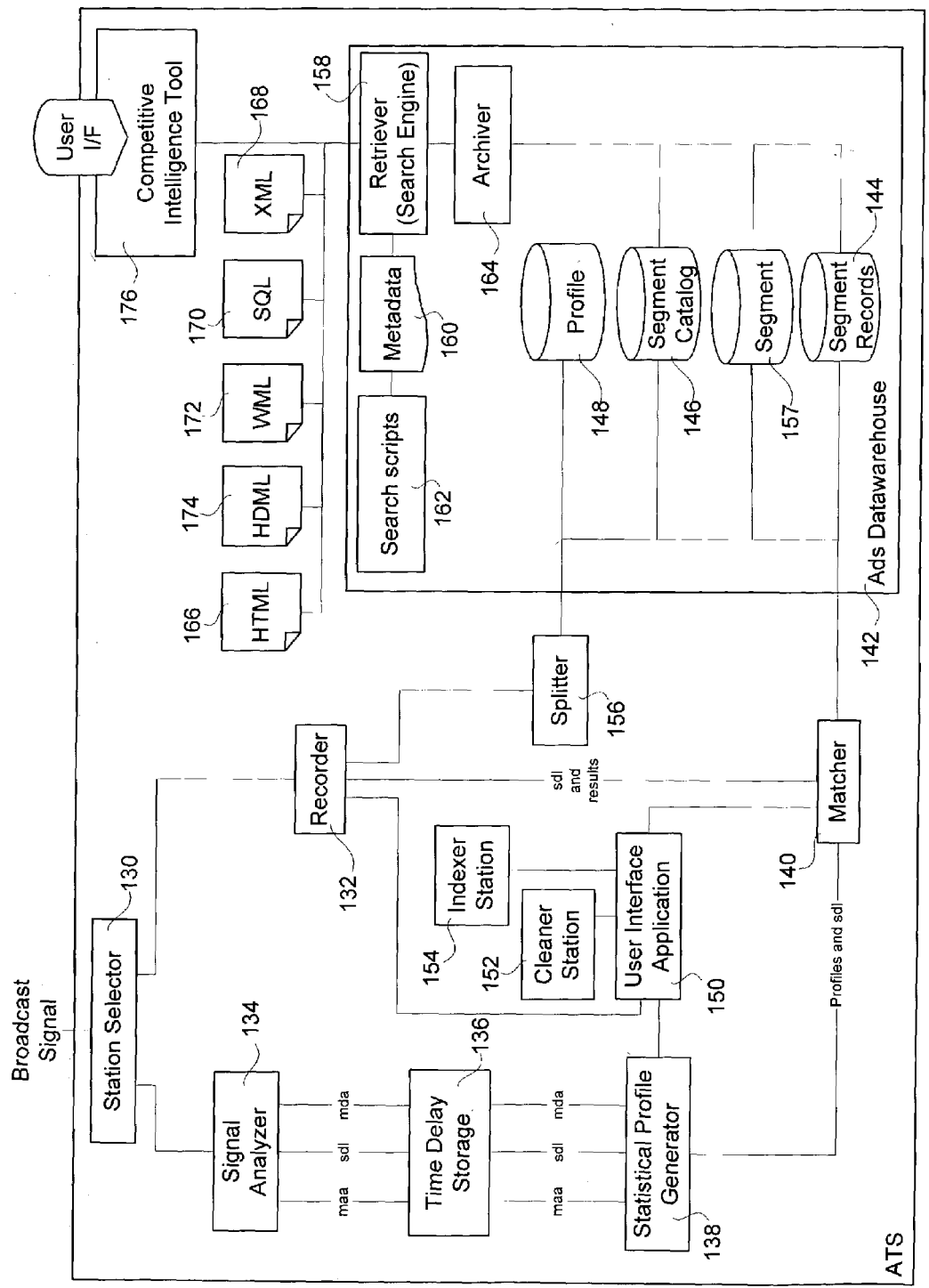
FIG. 6 is a schematic block diagram of principal functional elements of an ad tracking system in accordance with the invention.

FIG. 6 schematically illustrates principal functional elements of an ad tracking system in accordance with the present invention. The advertising tracking system is designed to detect publicity breaks in TV programs, to extract probable segments that likely constitute the publicity breaks (e.g. ads, promotions, bumpers, station identifications) and to characterize each of the segments.

A station selector 130 is adapted to receive a broadcast signal, decompress the signal if required, and send copies of the signal to a recorder 132, and a signal analyzer 134. A video signal broadcaster (such as a TV, or a Web TV broadcaster, or a cable, satellite or other wireless media company), transmits a broadcast signal that is received by the station selector 130. As is known in the art there are various signaling formats in which the channel may be received, and various formats available for storing such data. The ad tracking system is independent of any particular video/audio encoding format such as audio-video interleaved (AVI), moving picture experts group (MPEG). In accordance with the present embodiment, the recorder 132 is adapted to receive and store the composite broadcast signal, in it's entirety. In accordance with alternative embodiments, the broadcast signal may be stored in a compressed format, and information may be disregarded to conserve computer memory. The ad tracking system treats the video or audio source signal only once, and works with mean audio amplitude and mean display attribute streams generated there from to detect, extract and match broadcast segments. The system can therefore work substantially in real-time, or in batch mode, making the system suitable for different applications. The signal analyzer 134 is adapted to receive the broadcast signal, and generate mean audio amplitude (maa) and mean display attribute (mda) streams, as well as the segment demarcation list (sdl). Functional components of the signal analyzer 134 are further illustrated in FIGS. 7, 9 and 12, and will be further discussed in depth with reference to these.

A time delay storage unit 136 receives and stores the output of the signal analyzer 134, and provides the output to a statistical profile generator 138. The statistical profile generator 138 is adapted to interface with a matcher 140, to provide the matcher 140 with statistical profiles and the segment demarcation list. The statistical profile generator 138 is further discussed below with reference to FIGS. 17–19g.

The matcher 140 is adapted to query an ads datawarehouse 142, to create and update records on a segment records database 144, a segment catalog database 146, and a profiles database 148. The matcher 140 is further adapted to query the profiles database 148 for each received statistical profile, to determine if the received statistical profile matches that of any archived segment. Once the matcher 140 has queried the profiles database 148 for all of the time code intervals in a fixed length of the broadcast signal (i.e. those found in the segment demarcation list), it sends the segment demarcation list to the recorder 132, along with results of each of the queries. A result of a matching query, in accordance with the present embodiment, is one of: positive (i.e. the profile matches that of segment segment_ID) ambiguous (i.e. the profile matches with segments: segment1_ID segment2_ID", or the match failed.

The recorder 132 is adapted to extract probable segments identified in the segment demarcation list, and mark the probable segments for cleaning. A user interface application 150 is adapted to generate a timeline for the fixed length of the broadcast signal, and color-code the time code intervals identified in the segment demarcation list according to the results of the matching query. The user interface application 150 is adapted to display the timeline to a cleaner station 152. The cleaner station 152 provides an operator with the ability to view the timeline, and verify that each of the probable segments constitutes a respective broadcast segment, and that no segment has been excluded from the segment demarcation list. If a result for a query of an interval is that it is ambiguous, the multiple matching segments are displayed to the operator of the cleaner station 152, so that if one of the matching segments does match, this can be identified. The operator may also, in other embodiments, verify that each matched segment does indeed match, or perform content-based queries to the segment catalog database 146 to test if the probable segment is an undetected rebroadcast of a segment. The operator of the cleaner station 152 may modify the timeline produced from the segment demarcation list, or approve the timeline defined by the segment demarcation list. If, for example the operator notices that an interval does not constitute a segment, then the interval may be deleted from the segment demarcation list. If a segment has to be added to the segment demarcation list, the operator obtains start and end time codes for the missed segment, and forwards these to the statistical profile generator 138 that requisitions the mean value streams between the start and end time codes, and generates a statistical profile for the missed segment. The missed segment is then received by the matcher 140, which queries the profiles database 148, to determine if the missed segment is a rebroadcast segment. Results of the query are returned to the cleaner station operator via the user interface application 150 and cleaner station 152.

The system further comprises an indexer station 154 that provides an indexer with an interface for viewing the segments, and to identify aspects of the content of the segment. A set of attributes describing the new ad in the segment catalog database 146 is created. Such attributes include a type of ad, a season, a geographical location, characters, objects, a product or service sold, an associated company, etc. The indexer station 154 accesses the new segments via the user interface application 150, and can therefore update the segment catalog 146 to include the list of attributes of the new segments.

A splitter 156 is adapted to receive the new segments in the segment demarcation list that the operator has accepted, and to generate respective records to be stored in a segment database 157 of the ads datawarehouse 142. The ads datawarehouse 142 is a general-purpose repository of the segments (at least those of commercial advertisements; bumpers, promotions and other non-commercial segments may be discarded by the operator of the cleaner station).

The ads datawarehouse 142 constitutes an advanced repository of video advertising material from segments extracted from broadcast signals, with a complete set of sophisticated tools to exploit the content for information retrieval and competitive intelligence purposes. There are four chief databases in the ads datawarehouse 142, the segment catalog database 146, the segment records database 144, the profile database 148, and the segment database 157.

The segment catalog database 146 contains an index of all the adverting material stored in the ads datawarehouse 142 with an extensive set of attributes describing each of the ads. The segment catalog database 146 therefore permits the searching and retrieving of ad material by the content described with the attributes. The retrieval can be further used to generate information or statistics regarding the content of the ads datawarehouse 142.

The segment records database 144 contains a record for each appearance of each of the segments stored in the ads datawarehouse 142. This database permits users to select advertisements to view a time, date or station of airing, for example. A number of times a commercial advertising segment was broadcast (and when and at which station) is of known use in competitive intelligence techniques.

The profile database 148 contains all the statistical profiles for all segments indexed by the segment catalog database 146. The profile database 146 may further contain frequently misidentified segments to prevent their incorrect detection. So for example, a thirty second long scene-setting lead-in to a television program that is frequently played immediately after a publicity break, may be prone to false detection by the system. Consequently, matching the non-segment may serve to prevent misidentification of the lead-in. The profile is queried by the matcher 140 to identify rebroadcast segments.

Finally, the segment database 157 contains the entire video stream recording, in MPEG or any other suitable compression format for all the advertising material indexed by the segment catalog database 146.

The ads datawarehouse 142 is further adapted to be searched, and contains a retriever 158, metadata 160 and search scripts 162, for receiving and interpreting queries, identifying where to search for the response, and accessing an archiver 164 to effect the retrieval of data to reply to the queries. The metadata 160 contains the structure of the content of the datawarehouse, and provides the rules and instruction used to access and manage the content. The archiver 164 is adapted to manage records in the ads datawarehouse 142, backing up data for security purposes, transferring old data to off-line media support etc. The archiver 164 manages memory in the ads datawarehouse 142 to ensure good performance. The archiver 164 also retrieves the data from the off-line media support, on request.

The retriever 158 is a search engine used primarily to search the segment catalog database 146 with specific criteria such as the advertiser, brand, product, etc. Preset search scripts are stored within the ads datawarehouse 142 and facilitate retrieval by frequently used search criteria.

The retriever 158 is adapted to receive queries in a plurality of languages for data exchange and presentation with external system, including: hyper-text markup language (HTML) 166, extensible markup language (XML) 168, structured query language (SQL) 170, wireless markup language (WML) 172, or handheld device markup language (HDML) 174. HDML 174, and WML 172 are used by many wireless devices and HTML 166 and XML 168 are used by web browser applications. Of course these languages are just a sampling of the languages that can be used to query the ads datawarehouse 142. Other languages for wireless users (such as palm query application (PQA)) and other markup languages (such as generalized markup language (GML)), and fourth generation languages (4GLs) may be added, depending on demand. The retriever 158 is further disposed to receive queries from a competitive intelligence tool 176 that monitors advertisements relating to particular products or corporations for analysis, and provides a business intelligence tool for competitive analysis purposes. The competitive intelligence tool 176 is a multi-dimensional data repository interface that provides different perspectives and indexing modes to the ads datawarehouse 142. The retriever permits different users with different equipment to access the content of the ads datawarehouse 142. Other than a personal computer or wireless communications device, an external system may use an SQL request or an XML exchange standard message to request to view a segment, and a television video player or an MPEG player may be used, for example, for viewing the selected segment.

Signal Analyzer

Figure 7:
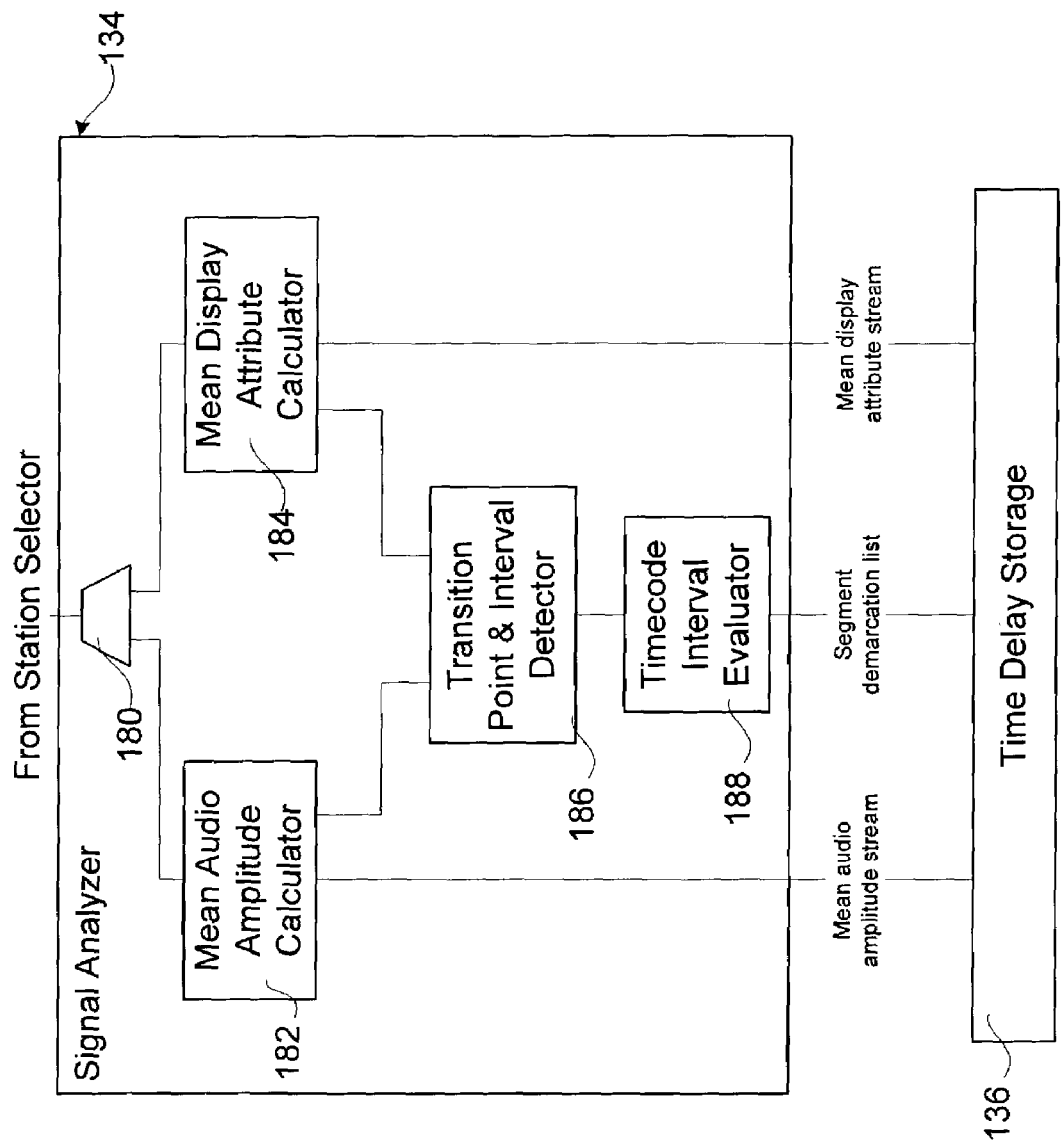
FIG. 7 is a schematic block diagram of principal functional elements of a signal analyzer, in accordance with the invention.

FIG. 7 schematically illustrates principal functional blocks of the signal analyzer 134 (of FIG. 6). A demultiplexer 180 is adapted to receive a broadcast signal from the station selector 130, and separate an audio component from the composite signal, in a manner well known in the art. The audio component is fed to a mean audio amplitude calculator 182, and the video component is fed to a mean display attribute calculator 184. The mean audio amplitude calculator 182 is adapted to first sample the amplitude of the audio component, in a manner known in the art, and then to compute an average of the samples concurrent with each frame (or other suitable unit) of the broadcast signal. Preferably the absolute value of the normalized audio amplitude is sampled. In a manner known in the art, the audio samples concurrent with each frame are collected, for averaging. So the mean audio amplitude stream generated by the mean audio amplitude calculator 182 comprises averages of the absolute values of the normalized audio amplitude values of the samples concurrent with respective frames.

A mean display attribute calculator 184 is adapted to receive a video component of the composite signal, and calculate a mean value of respective display attribute values of a predefined set of pixels in the frame. The predefined set of pixels may be, for instance, a set of pixels lying on pre-selected diagonals of the frame. It has been found that 80 percent of pixels lying on 10 diagonals suffice for characterizing the display attribute value of the frame for present purposes. A mean display attribute calculator is further discussed below with reference to FIG. 8.

The mean audio amplitude values generated by the mean audio amplitude calculator are issued in a stream to both the time delay storage unit 136, and a transition point and interval detector 186. Similarly the mean display attribute values generated by the mean display attribute calculator are issued in a stream to the time delay storage unit 136 and the transition point and interval detector 186. The transition point and interval detector 186 is adapted to analyze the mean audio amplitude and mean display attribute streams, to identify candidate segment transitions and then time code intervals delimited by transition points derived from respective candidate segment transitions. The transition point and interval detector 186 produces a weighted interval list that includes a set of all detected time code intervals and associated confidence measures. The weighted interval list is forwarded to a time code interval evaluator 188 that tests the arrangement of the time code intervals in the weighted interval list to measure how well each individual interval fits with the other time code intervals in the weighted interval list, in conformance with expected arrangements of segments in broadcast signals. The transition point and interval detector 186, and time code interval evaluator 188 are further described below with reference to FIGS. 9, and 12, respectively. The segment detector is adapted to issue a segment demarcation list (further discussed below with reference to FIG. 16) to the time delay storage unit 136.

Mean Display Attribute Calculator

Figure 8:
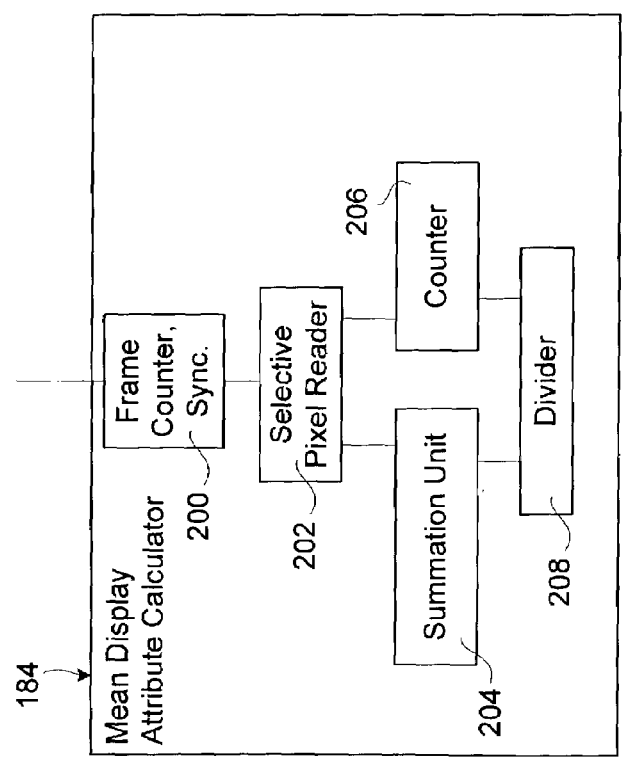
FIG. 8 is a schematic block diagram of principal functional elements of a mean display attribute calculator, in accordance with the present invention.

FIG. 8 illustrates principal elements of a mean display attribute calculator 184 of the present invention. A frame counter and synchronization unit 200 is adapted to receive the video component of the broadcast signal, and to identify the beginnings and ends of frames, in a manner known in the art. The frames of the video component are forwarded one at a time to a selective pixel reader 202 that is adapted to receive the frames, read a predefined set of pixels from the frame, and forward the values in sequence to a summation unit 204, while a counter 206 counts the number of pixels. After a frame is flushed from a memory of the selective pixel reader 202, the sum carried by the summation unit 204 is divided by the value of the counter 206, yielding a mean value of the read values of the pixels.

As is known in the art, the video component of most broadcast signals (main carrier) carries hue and saturation values as well as a one-byte luminance value. It has been found that the luminance value suffices to characterize a pixel of the video component for the purposes of the present invention, however a combination of the other values with the-luminance may serve at least as well. Any value of a pixel calculated in dependence upon the luminance value (at least in part) is, for the present purposes, a mean display attribute value. Any value that can be calculated with a known formula from the composite signal, be it of the NTSC, PAL or other standard, is intended by the term.

In another embodiment of the invention, a summation unit receives and counts a sequence of mean display attribute values of the selected pixels and, when the count reaches a fixed number, divides the sum by the fixed number.

Figure 9:
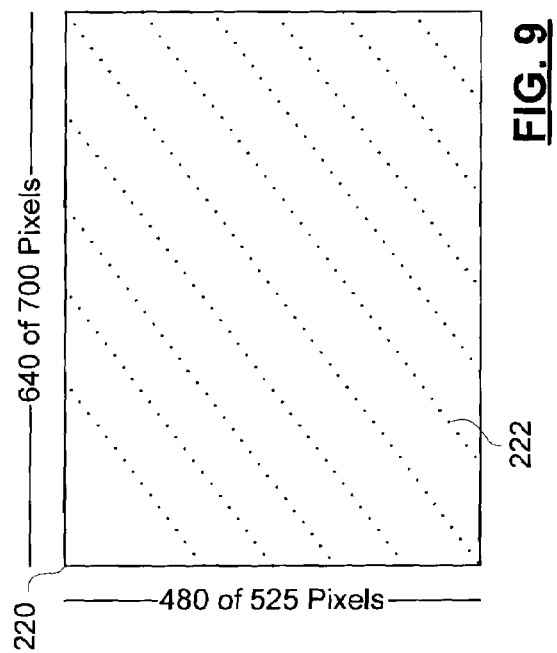
FIG. 9 schematically illustrates pixels of a standard television video frame selected in accordance with an embodiment of the invention.

FIG. 9 illustrates an embodiment of pixels used to determine a mean display attribute value of a frame, in accordance with objectives of the invention. Preferably enough pixels are selected to statistically represent the pixels of the frame, so that slight misalignment of the pixels does not yield a substantially different mean value. In order to minimize a number of the selected pixels, while providing adequate statistical representation of the pixels in the frame, it is desirable to spread the selected pixels out over the frame. Given that strong horizontal and vertical correlations may exist within luminance values of pixels in frames, it is not preferable to select lines of pixels, or substantially vertical sets of pixels. A set of 10 substantially evenly spaced diagonals is therefore chosen. The set includes a major diagonal, in accordance with the present embodiment. It will be recognized by those of skill in the art that any other set of substantially statistically representative pixels can equally be chosen. All of the active pixels on the diagonals formed to approximate to respective ones of the lines:

$y=(\frac{3}{4})x+k(480/(1\frac{1}{2}))$, where $k=[-4, -3, \ldots, 0, 1, \ldots, 5]$ are not selected, but rather a fixed proportion of these taken at approximately regular intervals, are selected. It has been found that an average of 80 percent of the pixels on 10 diagonals (about 2000 pixels) of an NTSC frame suffice to characterize the luminance (or other mean display attribute) of a frame. Illustrated in FIG. 9, is a NTSC frame 220 of approximately 640 active pixels (of 700 total pixels) on each of about 480 lines (of 525 total lines). Each of 10 diagonals 222 is identified by a dotted line to schematically illustrate the selected pixels.

While the present illustration is described with reference to a NTSC composite signal, the invention is in no way restricted to NTSC signal processing, and it is obvious to those of skill in the art how to practice the present invention to frames of video signals of other standards.

FIG. 10 illustrates a one second sample of the mean display attribute and mean audio amplitude streams generated from respective audio component and video component of a broadcast television signal. The frames are identified by a time code in col. 1, which consists of a relative time measured in seconds to three decimal places. The zero of the time code occurs at a beginning of a fixed length of the recorded broadcast signal. In current embodiments of the ad tracking system, near real-time processing of the broadcast signal is possible. Consequently the time delay storage unit 136 is used to store the mean audio amplitude and mean display attribute streams while their copies are analyzed to generate the segment demarcation list. In accordance with an implementation decision, a fixed length of the broadcast signal of approximately one hour is analyzed at a time by current embodiments of the ad tracking system.

Figure 11A:
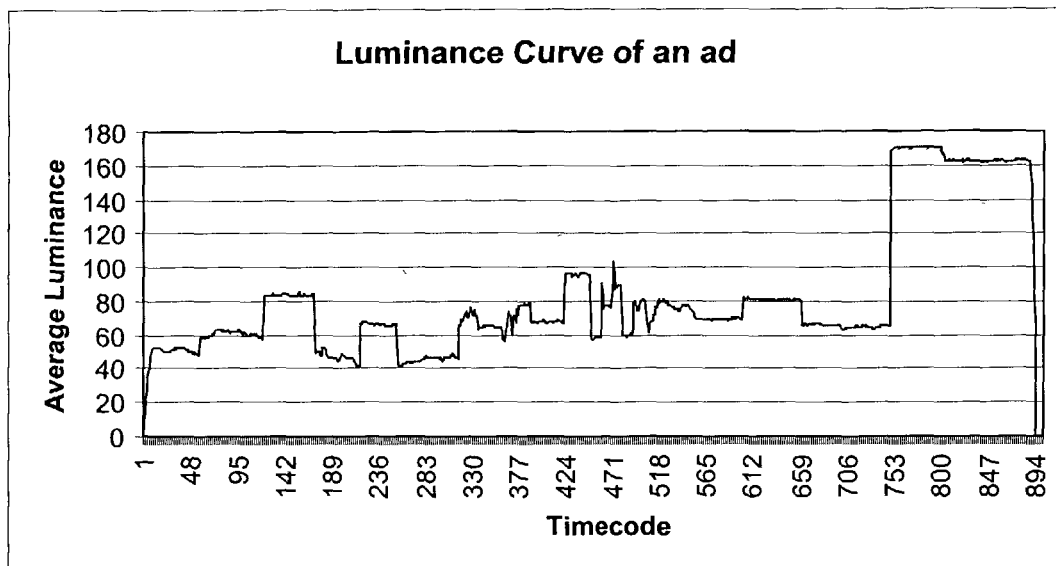
FIGS. 11a and 11b are schematic plots of a mean display attribute stream and a mean audio amplitude stream, respectively.

FIG. 11a is an example plot of a mean display attribute stream of a commercial advertisement segment. The selected video component is the luminance value. Although the luminance value ranges over whole numbers between 0 and 255, it is readily perceived that in the segment illustrated, the values range between about 40 to about 175. The x-axis represents a time code in units of frames.

Figure 11B:
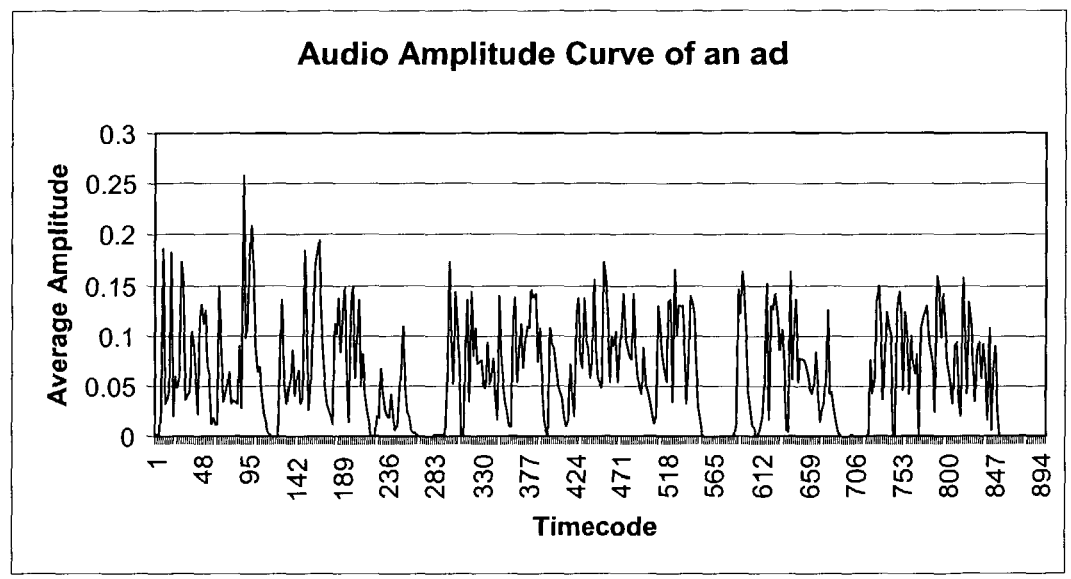

FIG. 11b is an example plot of a mean audio amplitude stream of the commercial advertisement segment illustrated in FIG. 11a. The absolute values of the normalized audio amplitude range from 0 to 1, however, in the present example, a highest amplitude achieved during the commercial advertisement segment is about 0.26.

Figure 12A:
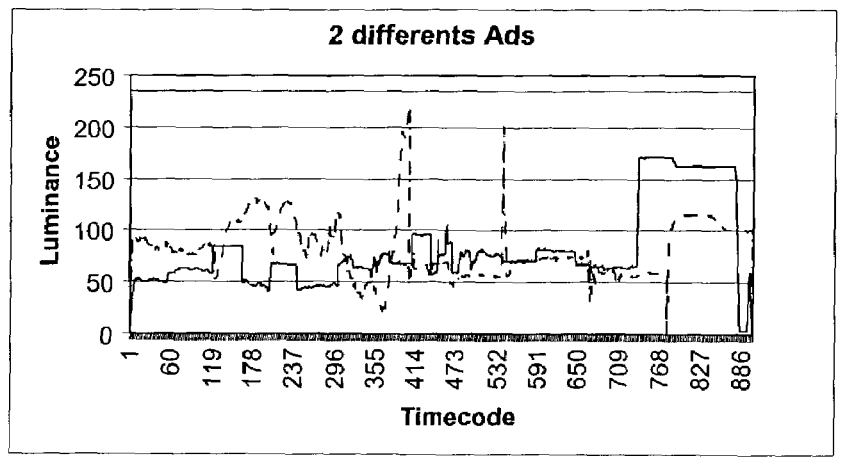
FIGS. 12a, 12b and 12c are overlays of schematic plots of pairs of mean luminance streams, to illustrate how a mean luminance stream differentiates video segments in accordance with the invention.

FIG. 12a is a comparison of mean display attribute streams of two different commercial advertisement segments of equal duration. While there are some gross features these two segments share, it is clear that there are a great many differences between the two. Differentiating these differences using statistical properties is fairly easy. As the dashed plot varies much more than the solid plot, the standard deviations (or respective second moments about most values) will be greater for the dashed mean display attribute stream than for the solid one. Respective mean values of the mean display attribute streams do not obviously differentiate the two. However, it is clear that over the first half of the segment, the dashed mean display attribute stream has a significantly higher mean value, whereas in the second half of the segment, the dashed mean display attribute stream has a significantly lower mean value, which is most pronounced in the final quarter of the segment.

Figure 12B:
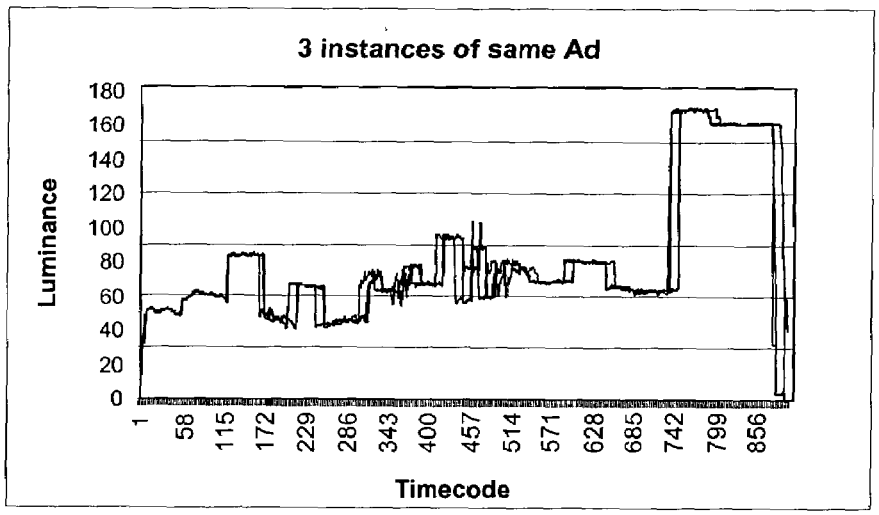

FIG. 12b is an overlay of three plots of the same commercial advertisement segment (which happens to be that of the solid mean display attribute of FIG. 12a). Three different mean display attribute streams generated these plots which are overlaid. As will be readily apparent to one of skill in the art, there is an offset between the start and end times of the three, providing the illusion of a horizontal shift. Given the difficulties associated with accurately capturing start and end times of the segments, it is necessary to avoid characterizing the segment using time-sensitive properties.

Figure 12C:
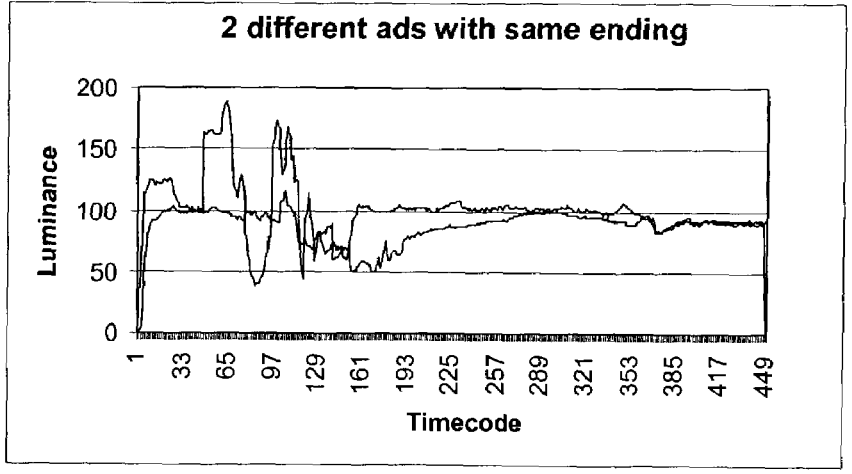

FIG. 12c is an overlay of two plots having a common ending. The final 90 frames (roughly from 360 to 450) of both mean display attribute streams, are substantially identical. Some segments may be characterized in that they have a part of the segment identifying a sponsor, company, etc. It is useful for competitive intelligence purposes to automatically identify these common features.

Transition Point and Interval Detector

Figure 13:
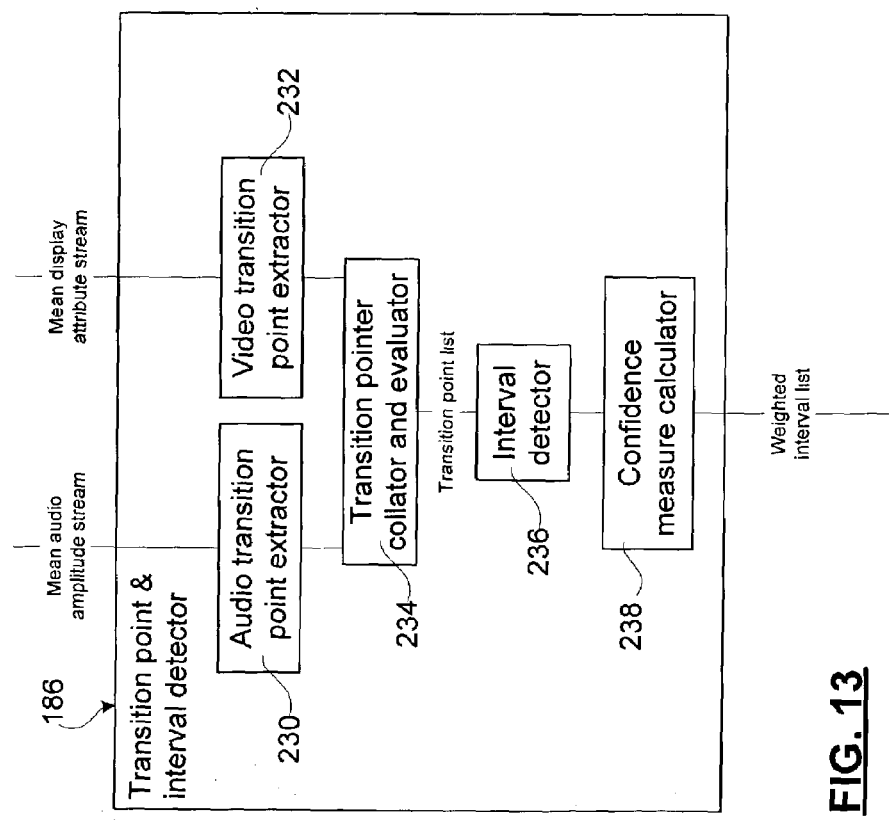
FIG. 13 is a schematic block diagram of principal functional elements of a transition point and interval detector in accordance with the invention.

FIG. 13 schematically illustrates principal functional blocks of the transition point and interval detector 186. An audio transition point extractor 230, and a video transition point extractor 232 receive the mean audio amplitude stream and the mean display attribute stream, respectively. Each of these identifies audio/video fades in accordance with audio/video thresholds, respectively. The audio/video thresholds may be predefined and fixed, or vary with average values of predefined intervals, or further may be tuned by up stream processors, in ways known in the art. The audio/video fades are used by a set of extraction rules to detect candidate segment transitions, which are groups of consecutive frames that nearly all have mean values below the respective threshold. In accordance with the present embodiment, a (time code of a) minimum, and a duration is used to represent each candidate segment transition although other equally useful values could be used. Each transition point indicates a time code of the candidate segment transition from which it was derived, but may further include any number of the following: time codes of a start, middle, interrupting, or end frame; an average of the mean values of the duration, a consecutive set of pixels near a minimum, or a consecutive set of interrupting pixels; a duration of a consecutive set of interrupting pixels, or minima; and a number of consecutive sets of interrupting pixels, or minima. The minimum is a time code of a lowest value of the mean audio amplitude or a mean display attribute stream within the candidate segment transition.

In accordance with the present embodiment, if there are a plurality of frames that have the lowest value, a first, last or middle one may be chosen. Alternatively, one may be chosen in dependence upon interrupting frames, (frames in the candidate segment transition that are above the threshold), a number of consecutive frames with the lowest value, or other such criteria as previously explained. The duration of a candidate segment transition is a difference between a time of the first audio/video fade frame, and that of the last. More particularly, a time derived by linear interpolation between a last frame prior to a candidate segment transition, and a time of the first frame within the candidate segment-transition, is chosen as the start time of the candidate segment transition, and likewise with the end time. Current embodiments use a fixed audio threshold of 0.003, and a fixed video threshold of 15. For example, from the one second portion of the mean audio amplitude and mean display attribute streams illustrated in FIG. 10, a candidate segment transition is located in the mean audio amplitude stream having a minimum of 215.734 and a duration of 0.1053s, which has an interrupting frame at 215.769. A candidate segment transition will also be detected in the mean display attribute stream with minimum 215.734 and a duration of 0.1569.

The pairs of minima and duration of the candidate segment transitions that are detected by the audio transition point extractor 230 or the video transition point extractor 232, are forwarded to a transition point collator and evaluator 244 that collates the pairs of minima and duration and forms a transition point list. The transition point list contains a merged set of the minima, each of which being generated from a respective candidate segment transition found in the mean audio amplitude or mean display attribute stream, and an associated weight. If the minima of two candidate segment transitions extracted from respective ones of the mean audio amplitude and mean display attribute streams, are calculated to be close enough, given their respective durations and a predefined tolerance value, only one candidate segment transition is included as a transition point in the transition point list. Such will presumably be the case for the example candidate segment transitions detected from the one-second excerpts of the mean audio amplitude and mean display attribute streams given any reasonable definition of coincidence, as their overlap is glaring. The transition point that is included, in accordance with the present embodiment, will have the minimum of the one of the two candidate segment transitions with the smallest duration, so that the more precisely identified candidate segment transition is included in the transition point list. In the case of our example one second excerpt, the candidate segment transition detected in the mean audio amplitude stream is included in the transition point list, as its duration is smaller. The weight, of the transition point is calculated in dependence on which of the mean value streams (or both) the candidate segment transition was extracted from, in accordance with the present embodiment. In alternative embodiments, the weight may depend on a measure of similarity between the candidate segment transition that the transition point is derived from, and one or more typical segment transitions.

An interval detector 236 receives the transition point list, and searches through the list of corresponding minima of the respective transition points to identify time code intervals that are of expected durations for segments. As the segments begin and end with the segment transitions, and the segments have expected durations of whole numbers between 3s and 15s, or 30s or 60s, identification of these durations has been known in the art as a useful means for identifying segments. Given that the candidate segment transitions are represented by a respective minimum and duration, it is possible to calculate an elapsed time between two transition points with a relatively simple rote procedure. Only one (a shortest) interval of expected duration is found starting with a given transition point, in accordance with the present embodiment. The algorithm used, finds an interval beginning with a given transition point, by examining the next transition point in the transition point list, calculating an elapsed time between the two minima, and, if the elapsed time is not, within a first margin of error, an expected duration, a subsequent transition point (to the next transition point) is examined. This process is repeated until an examined transition point is found with an elapsed time from the given transition point that is of an expected duration (in which case a time code interval is detected), or the elapsed time is greater than that of a greatest expected duration (in which case no time code interval is detected). If no time code interval is detected, a second iteration of substantially the same procedure is performed using a second margin of error greater than the first margin of error. There may be any number of these iterations, limited only by the costs of computer time. It is obvious to those of skill in the art that many alternative search procedures can be used, some providing more and some providing fewer time code intervals for any given transition pointer list.

A confidence measure calculator 238 is adapted to assign a confidence measure to each of the time code intervals detected by the interval detector 236. The confidence measure calculator 238 assigns confidence measures in dependence upon; the margin of error within which the time code interval was detected, a duration of the time code interval (as some expected durations are far more prevalent in broadcast segments than others), and the weights of the two transition points that delimit the interval. In other embodiments, however, the difference between the elapsed time and the expected duration, and the durations of the transition points may also be considered by the confidence measure calculator 238. The confidence measure calculator 238 appends detected time code intervals, with their respective confidence measures to a weighted interval list, which it issues to the time code interval evaluator 188.

Timecode Interval Evaluator

Figure 14:
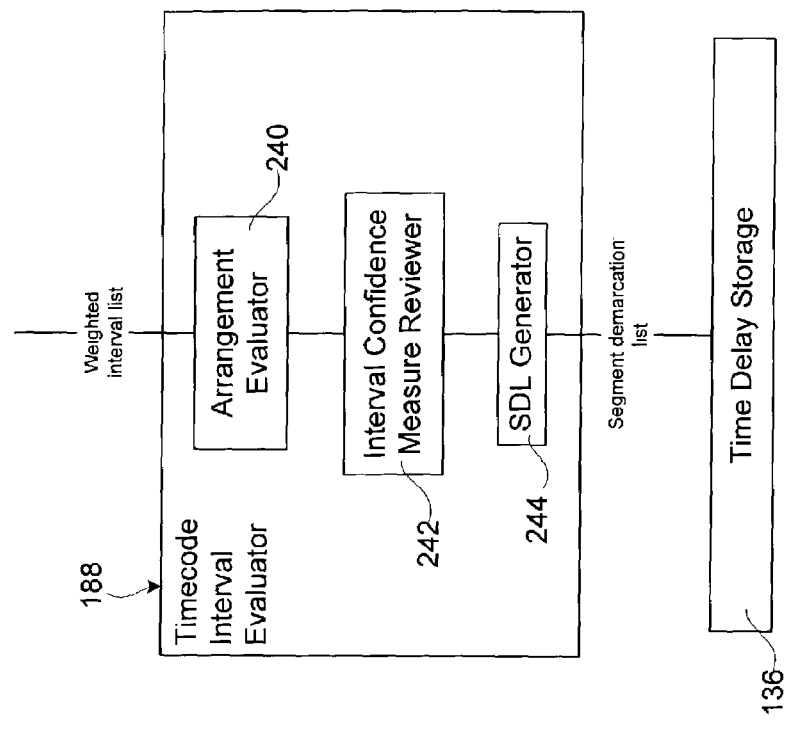
FIG. 14 is a schematic block diagram of principal functional elements of a segment detector, in accordance with the invention.

FIG. 14 illustrates principal functional blocks of a time code interval evaluator 188. The weighted interval list produced by the confidence measure calculator 238 of the transition point and interval detector 186, is received by an arrangement evaluator 240 which is adapted to apply tests to the time code intervals. The tests are designed to identify collections of the time code intervals that conform to rules describing how segments are arranged in broadcast signals. A few such rules are fairly obvious and known in the art: segments do not overlap in time, there is no appreciable gap between an end of a segment and the beginning of another (neglecting the segment transition), segments occur in publicity breaks, and not alone, etc. Rules may also be formed about minimum programming blocks between publicity breaks, a maximum number of bumpers, or promotions in a publicity break, a position of bumpers in a publicity break, a maximum or minimum ratio of 3–14 second time code intervals to a total number of time code intervals in the publicity break, a maximum duration of a publicity break, regulatory rules for advertising time allowed by hour, etc. Most of these rules may be combined into a test of conformance to a publicity break reference pattern. There may be thousands of publicity break reference patterns that can be cataloged and used for comparison, each with a respective probability of occurrence that can be used for incrementing the weights of the time code intervals that conform.

The set of rules used can be modified or extended as desired and can be applied totally or partially according to a level of detection precision required for a specific application, for example. The system can further be adapted to follow changes to advertising and promotional material production and insertion rules used by respective broadcasters for different regions or countries.

Figures 15, 16:
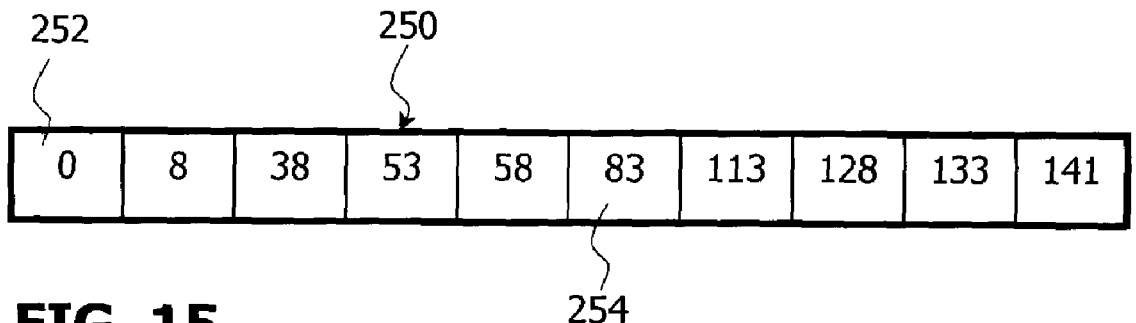
FIG. 15 is an example of a program break reference pattern for use in segment identification.
FIG. 16 is an example of a segment demarcation list in accordance with an embodiment of the invention.

FIG. 15 is an example of a publicity break reference pattern 250 for use in a rule used for segment detection. The 10 divisions correspond with respective segments that are of fixed duration. A first division 252 carries a value 0 and subsequent divisions, such as division 254, carry a time respective to the first, to facilitate comparison with the weighted interval list. In general, a publicity break reference pattern is a linear vector of N values, the first value is 0, and all other values are time codes of segment pointers relative to the first. The number of values in the linear vector is equal to a maximum number of segments in the publicity break reference pattern, and constitutes an upper limit on the number of time code intervals in a group that matches the publicity break reference pattern, in accordance with an embodiment of the invention. The matching of a group of time code intervals with the publicity break reference patterns may be implemented with a query to a reference pattern database, for example. The publicity break reference patterns may be generated automatically prior to the system's operations, using for example rules relating to: likely durations of segments; minimum and maximum durations of publicity breaks; and maximum number of segments in a publicity break.

A result of the testing performed by the arrangement evaluator 240 is received by an interval confidence measure reviewer 242 that uses the results to modify confidence measures of respective time code intervals.

A segment demarcation list generator 244 makes a final decision regarding which time code intervals most likely constitute segments, preferably using all of the information provided in the foregoing analysis: the modified confidence measures, the weights of transition points that delimit the time code intervals, and the mean audio amplitude and mean display attribute values of the transition points. The segment demarcation list generator 244 is further adapted to issue a segment demarcation list to the time delay storage 136. The time code intervals selected by the segment demarcation list generator 244 are stripped of their confidence measures to form a time code interval that consists only of a start time code, and a duration.

FIG. 16 schematically illustrates a segment demarcation list that contains a plurality of time code intervals. The intervals are defined by a time code (such as time code 260), and a duration (such as duration 262). It will be readily apparent to the reader that the first 10 intervals, subsequent 10 intervals and last 5 intervals form three publicity breaks.

Statistical Profile Generator

Figure 17:
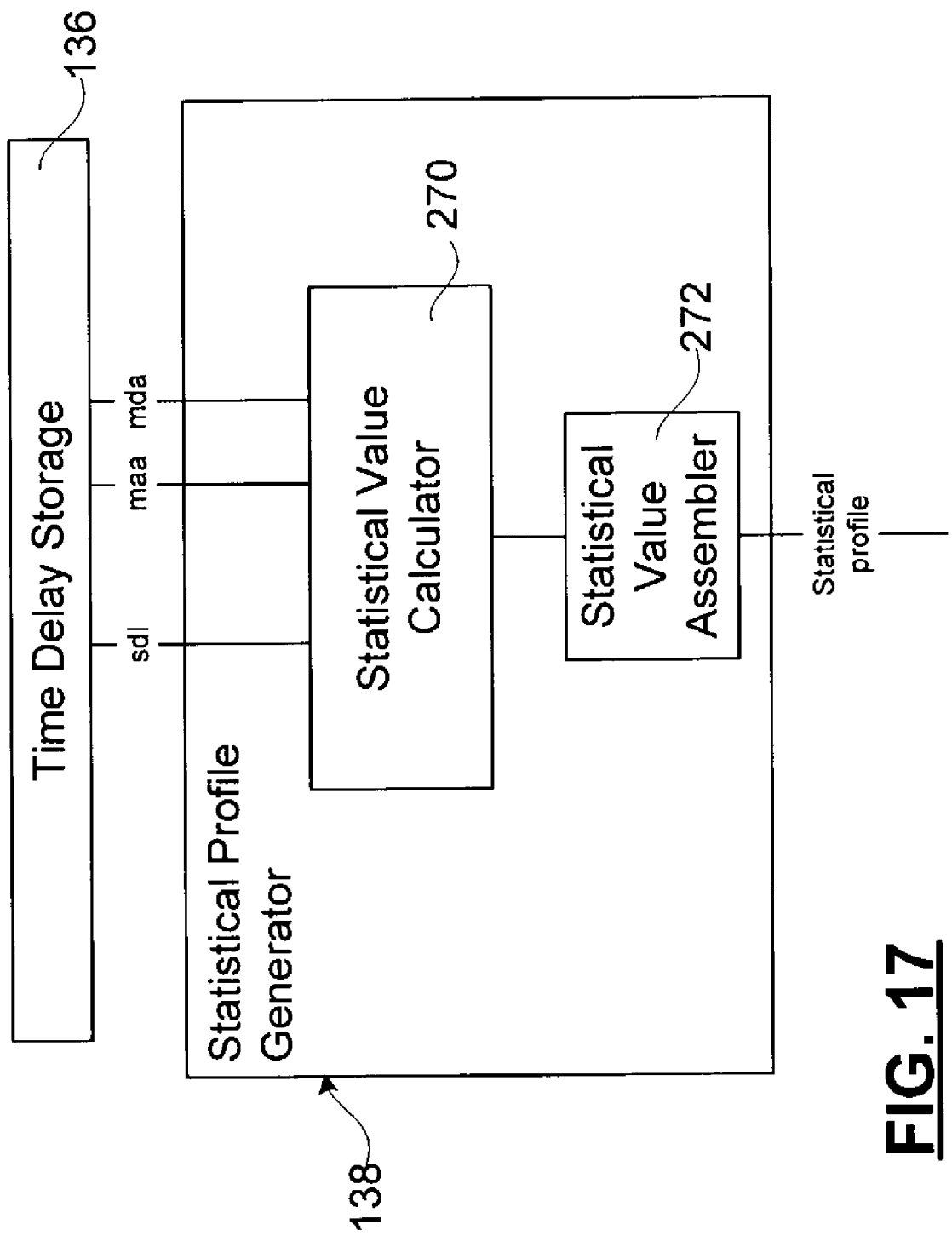
FIG. 17 is a schematic block diagram of principal functional elements of a statistical profile generator, in accordance with the invention.

FIG. 17 schematically illustrates principal functional blocks of the statistical profile generator 138. The statistical profile generator 138 is adapted to retrieve the segment demarcation list, and the mean value streams, from the time delay storage 136. A statistical value calculator 270 forms distributions of the mean values, and computes mean values for each of the mean value streams concurrent with each respective time code interval. The distributions are formed using predefined rules for generating subsets of a predefined set of the frames within the time code interval. The predefined set, in accordance with the present embodiment is all of the frames in the interval less two 10 percent buffer zones, one at the beginning and one at the end of the segments. The buffer zones prevent respective mean values of extraneous frames from being included in the distributions. In accordance with the present invention a hierarchy of levels (0, 1, 2, . . . , L) of groups of the subsets are defined, each level being indexed by a number n. At the $n^{th}$ level parsing, the stream is parsed into $2^n$ substantially equal-length subsets.

The statistical value calculator 270 further calculates a value of at least one statistical property of each of the distributions. As was previously stated, it is preferable to include as many values of statistical properties that independently characterize the distributions as can be easily stored, while ensuring that each of the statistical properties is as immune to noise, and other transmission/reception artifacts, as possible. Properties of the whole distribution, such as a mean value, a mean deviation from a mean value, an $n^{th}$ moment, a difference from a predefined distribution, etc. are therefore good candidates. Examples of 7 mean value distributions generated from a mean display attribute (mean luminance) stream, are further illustrated and discussed with reference to FIGS. 19a–g.

The statistical value calculator 270 outputs the values of the statistical properties of the distributions to a statistical value assembler 272 that is adapted to format the values of the statistical properties in conformance with a predefined statistical profile format.

Figure 18:
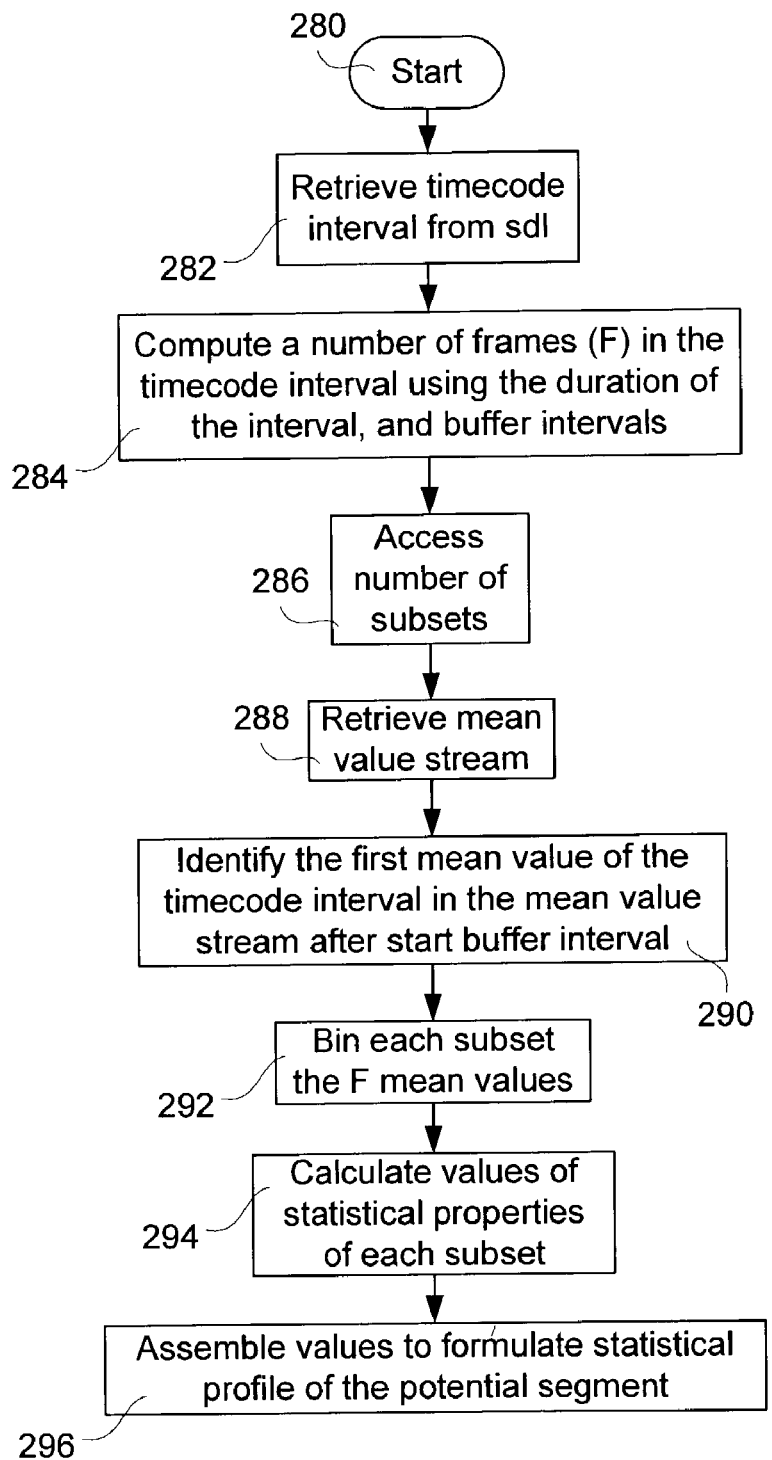
FIG. 18 is a flow chart illustrating principal steps performed by the statistical value calculator in accordance with the invention.

FIG. 18 schematically illustrates principal steps performed by the statistical profile generator 138, in accordance with an embodiment of the present invention, in greater detail than the process illustrated in FIG. 4. In step 280 the procedure begins. The statistical value calculator 270 receives a time code interval from the segment demarcation list (step 282). The duration (in seconds) of the received time code interval is read, and a number of frames (F) in the time code interval is calculated using the duration, (optionally a frame rate of the broadcast signal, if varying), and a predefined duration of the buffer zones (step 284). For the illustrated embodiment which uses two 10 percent buffer zones, F=(0.8)*s*r, where s seconds is the duration of the time code interval, r is a frame rate of the broadcast signal (NTSC composite signal, for example, has a frame rate of 29.97 frames/second).

A number of predefined subsets (those produced by a predefined function) of F are identified, in step 286. As previously described, the ad tracking system is preferably designed to calculate profiles to a precision specified by a user. This design feature is embodied in the current embodiment of the invention as a specifiable number of subsets. Each subset of the set of F frames has a respective table of counters. Each table of counters may serve any number of mutually disjoint subsets (without rereading values from the mean display attribute stream). In some embodiments of the present invention, only one table of counters is needed, as all of the predefined subsets are disjoint. As the subsets of F may not be chosen to be disjoint, a plurality of tables of counters may be required. The number of tables of counters required is equal to a greatest number of subsets any particular frame is in. That is, a table of counters is required for each of the predefined subsets of F in a maximal set of intersecting subsets. For example, preferred embodiments of the invention use several tables of counters, one for each level in the hierarchy of levels, as each level consists of a disjoint parsing of the set of F frames into a respective number of subsets.

The mean display attribute (and possibly also the mean audio amplitude) stream corresponding to the time code interval, is retrieved from the time delay storage 136 (step 288). A first mean value in the retrieved part of the mean display attribute stream (after the start buffer zone) is located (step 290). The mean display attribute values of successive frames of the mean display attribute stream are read. Each value that is read increments counters for each of the tables of counters, associated with the mean value. When the frames of a subset have all been read, the corresponding table of counters is reset. When a table of counters is reset, the values carried in the counters are stored, and then flushed. Once an $F^{th}$ value is read and binned (step 292), all of the subsets will have been counted, and the values carried in the bins are stored. Values of statistical properties are calculated for each of the distributions computed from respective subsets of the set of F frames, in step 294. The statistical values are forwarded to the statistical value assembler 272 where they are used to formulate a statistical profile characterizing the time code interval (step 296).

FIGS. 19a–g are example plots of the hierarchy of distributions, in accordance with the present invention. As a preferred embodiment, L levels are defined, each corresponding to a table of counters. Efficiently, each of the tables of counters counts each of the mean display attribute (and optionally the mean audio amplitude) streams in F as it is read. Each of the predefined subsets of F is indexed by a pair (level:order); wherein the level is defined above, and used to generate the predefined subset, and order is a number between 1 and $2^{level}$ that indicates which of the $2^{level}$ subsets serially generated at the table of counters numbered level, the predefined subset. The $2^{level}$ subsets generated by evenly parsing the F frames into the number of subsets. A hierarchy of the sets of bins is created, each of the levels of the hierarchy producing twice as many subsets as a previous level (except for the zeroeth level, which has only one subset; F, and no previous level).

Illustrated in FIGS. 19a–g are distribution plots of levels 0–2 for a particular interval. FIG. 19a is a plot of the distribution 0:1; FIGS. 19b&c are plots of distributions 1:1 and 1:2, respectively; and FIGS. 19d, e, f&g are plots of distributions 2:1, 2:2, 2:3 and 2:4, respectively. The differences in the distributions are readily apparent, and attest to the utility of the selected subsets for characterizing the interval. As is logically the case, the sum of distributions 1:1 and 1:2 equals the distribution 0:1, just like 2:3 and 2:4 equals 1:2, or the sum of level 2 distributions equals the level 0 distribution. It is worth noting that the statistical properties selected are not likewise additive. In accordance with the illustrated embodiment, the statistical properties of the distributions include a mean value and a mean measure of deviation from a mean value. The first mean value selected is the median, and the mean measure of deviation from a mean value is the standard deviation. The average of the medians of 1:1 and 1:2 is not determinative of the median of the level 0 distribution. Had the average been chosen as the mean value, the average of component distributions would be equal to the average of the distribution. Because of the uneven distributions, the median measure is not a close approximation to an average. Likewise, as the standard deviation is a measure of difference from the average of the distribution, and the average over the whole is not necessarily the same as the average over its parts, a standard deviation of one distribution is not derivable from the standard deviations of component distributions. Advantageously these statistical properties are chosen to increase the independence of the values obtained, and therefore the values are well chosen to characterize the interval.

The values presented in FIGS. 19a–g suggest a format for a statistical profile for characterizing the interval. For example:

Segment identifier
0:1.M=68, D=8.066747247
1:1.M=66, D=4.489528598
1:2.M=74, D=5.734479266
2:1.M=66, D=2.950155259
2:2.M=67, D=2.599676521
2:3.M=74, D=3.346271612
2:4.M=67, D=4.069673154;

may be used. Each profile contains a segment identifier (such as station, date and time of first broadcast).

If, as it does in other embodiments, the statistical profile includes statistical values of distributions generated in analogous manner from the mean audio amplitude stream, the associated statistical values could be further included in the statistical profile of respective intervals.

As was previously mentioned, the matcher 140 stores the profiles generated for each advertising segment in the profiles database 148. There are corresponding values of statistical properties of the one level 0, two level 1, four level 2, eight level 3, etc. distributions for as many such distributions as are generated. A number of levels (L) used in practice for signature matching may be variable, depending on the application and precision required.

The statistical profile so defined also facilitates the detection of different ads from the same advertiser, when the advertiser identification is present in the ads. Common frame sequences, especially if they coincide with the parts of the segment that are used to generate the distributions at some level, can be easily detected with modified matching queries. Using the three levels illustrated, the method is precise enough to discriminate a segment from tens of thousands of other segments.

The embodiments of the invention described above are intended to be exemplary only. The scope of the invention is therefore intended to be limited solely by the scope of the appended claims.

We claim:

1. A method for generating a statistical profile of a segment of successive frames of a broadcast segment for re-identifying the broadcast segment, comprising steps of:

calculating at least an approximate mean value of a display attribute of each frame in a predefined set of the frames of the segment;

binning the mean values of the frames, to derive at least one attribute distribution; and applying a statistical analysis to each of the at least one attribute distribution in order to produce a plurality of values of statistical properties that characterize the segment to be used to form the statistical profile for re-identifying the broadcast segment, wherein the step of calculating comprises:

computing a first mean value of the attribute distributions;

computing a mean measure of deviation from a second mean value of the attribute distributions;

averaging the values of the respective display attributes of a predefined set of pixels of each frame in the predefined set of the frames, the predefined set of pixels being selected to be representative of all of the pixels in the frame;

forming respective attribute distributions from respective subsets of the predefined set of frames in the segment;

calculating the value of at least one statistical property for each of the respective attribute distributions, the each of the attribute distributions being indexed by a label of the subset from which it is formed;

parsing the mean values of the frames generated by substantially all of the frames in the segment, into respective attribute distributions, each attribute distribution being generated from a sequential set of the frames in the segment, wherein the sequential sets used to generate the attribute distributions jointly include substantially all of the frames of the segment, and a sequence order of a particular sequential set in the segment indexes the attribute distribution generated with the particular sequential set; and multiply parsing the stream of the mean values to form a hierarchy of indexed attribute distributions wherein each particular attribute distribution is uniquely indexed by two whole numbers (n,r) where n is a level in the hierarchy, and r the sequence order of the sequential subset of frames used to generate the particular attribute distribution in an $n^{th}$ level parsing of the stream.

2. A method as claimed in claim 1 wherein the step of applying comprises a step of calculating values of the statistical properties that depend on the entire attribute distribution and are substantially immune to noise and other signal transmission and reception artifacts that may be present in the segment.

3. A method as claimed in claim 1 wherein the step of computing the first mean value comprises a step of determining a median value of the attribute distributions.

4. A method as claimed in claim 1 wherein the step of computing the mean measure of deviation from the second mean value comprises a step of calculating a standard deviation of the attribute distributions.

5. A method as claimed in claim 1 wherein the step of averaging comprises steps of:
- determining a value of the display attribute of a proportion of pixels coincident with one of a plurality of diagonals of the frame; and
- averaging a value of the display attribute of the proportion of the pixels.

6. A method as claimed in claim 5 wherein the step of determining the value comprises a step of measuring at least a one-byte luminance value of the proportion of the pixels.

7. A method as claimed in claim 1 wherein the segment further comprises an audio component, and the method further comprises steps of:
- calculating a mean audio amplitude value of the audio amplitude of each frame in the predefined set of the frames in the segment;
- tallying a number of the frames in each of the subsets of the frames that have a same mean audio amplitude value, for each mean audio amplitude value, to derive respective audio distributions for each of the respective subsets; and
- calculating the values of the statistical properties of each of the audio distributions to be included in the statistical profile.

8. A method as claimed in claim 7 wherein the step of calculating a mean audio value comprises a step of calculating an absolute value of a normalized amplitude of the audio component, averaged over each frame.

9. A method as claimed in claim 8 wherein the step of calculating an absolute value comprises steps of:
- sampling the absolute value of the normalized amplitude of the audio component; and averaging the samples concurrent with the frame.

* * * * *